United States Patent
Sharma et al.

(10) Patent No.: US 11,615,430 B1
(45) Date of Patent: Mar. 28, 2023

(54) METHOD AND SYSTEM FOR MEASURING IN-STORE LOCATION EFFECTIVENESS BASED ON SHOPPER RESPONSE AND BEHAVIOR ANALYSIS

(71) Applicants: Rajeev Sharma, State College, PA (US); Joonhwa Shin, State College, PA (US); Namsoon Jung, State College, PA (US)

(72) Inventors: Rajeev Sharma, State College, PA (US); Joonhwa Shin, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 0 days.

(21) Appl. No.: 13/999,280

(22) Filed: Feb. 5, 2014

(51) Int. Cl.
G06Q 30/02 (2012.01)
G06Q 30/0201 (2023.01)

(52) U.S. Cl.
CPC .................. *G06Q 30/0201* (2013.01)

(58) Field of Classification Search
CPC .......... H05K 7/20509; H05K 7/20545; H05K 7/1404; H05K 7/1407; Y10T 403/7064; Y10T 403/7066; Y10T 403/7067; G06Q 30/02; G06Q 30/0201; G06Q 30/0205; G06K 9/00771
USPC .............. 403/374.1, 374.2, 374.3, 350–352; 705/374.1, 374.2, 374.3, 350–352
See application file for complete search history.

(56) References Cited

U.S. PATENT DOCUMENTS

| | | | |
|---|---|---|---|
| 5,712,830 A * | 1/1998 | Ross | G01S 15/02 340/541 |
| 6,563,423 B2 | 5/2003 | Smith | |
| 6,598,025 B1 | 7/2003 | Hamilton et al. | |
| 6,659,344 B2 | 12/2003 | Otto et al. | |
| 7,606,728 B2 * | 10/2009 | Sorensen | G06Q 30/0201 705/7.29 |
| 7,930,204 B1 * | 4/2011 | Sharma et al. | 705/7.32 |
| 7,996,256 B1 * | 8/2011 | Anand et al. | 705/7.31 |
| 8,239,277 B2 * | 8/2012 | Lee et al. | 705/26.1 |
| 8,295,597 B1 * | 10/2012 | Sharma et al. | 382/173 |
| 8,660,581 B2 * | 2/2014 | Davis et al. | 455/456.3 |
| 8,665,333 B1 * | 3/2014 | Sharma et al. | 348/159 |
| 2006/0015408 A1 | 1/2006 | Brown | |
| 2006/0277104 A1 | 12/2006 | Overhultz et al. | |
| 2008/0005045 A1 | 1/2008 | Sorensen et al. | |
| 2011/0029997 A1 * | 2/2011 | Wolinsky | 725/12 |
| 2011/0085700 A1 * | 4/2011 | Lee | 382/103 |
| 2014/0289009 A1 * | 9/2014 | Campbell | 705/7.31 |
| 2015/0006245 A1 * | 1/2015 | Kuusisto et al. | 705/7.29 |

(Continued)

OTHER PUBLICATIONS

U.S. Appl. No. 11/805,321, Shama, et al.

(Continued)

*Primary Examiner* — Joshua T Kennedy

(57) ABSTRACT

The method and system evaluates the effectiveness of a display location within a store based on a behavioral response analysis of shoppers in the vicinity. The effectiveness of a display location is measured by tracking shoppers in-store, extracting and processing shopper attributes, and extracting metrics based on the processed attributes. The metrics of one location is compared to the metrics of another location to determine overall effectiveness.

4 Claims, 16 Drawing Sheets

(56) References Cited

U.S. PATENT DOCUMENTS

2015/0025936 A1* 1/2015 Garel et al. .................. 705/7.29

OTHER PUBLICATIONS

U.S. Appl. No. 11/818,554, Shama, et al.
U.S. Appl. No. 11/901,691, Shama, et al.
U.S. Appl. No. 11/999,649, Jung, et al.
U.S. Appl. No. 12/011,385, Shama, et al.
Liu, Hui, et al. "Survey of wireless indoor positioning techniques and systems." IEEE TSMC, Part C: Applications and Reviews on 37.6 (2007): 1067-1080.
Gu, Yanying, Anthony Lo, and Ignas Niemegeers. "A survey of indoor positioning systems for wireless personal networks." Comm. Surveys & Tutorials, IEEE 11.1 (2009): 13-32.
Yilmaz, Alper, Omar Javed, and Mubarak Shah. "Object tracking: A survey." Acm Computing Surveys (CSUR) 38.4 (2006): 13.
Knoop, Steffen, Stefan Vacek, and Rüdiger Dillmann. "Sensor fusion for 3D human body tracking with an articulated 3D body model." IEEE ICRA 2006.
Moeslund, Thomas B., Adrian Hilton, and Volker Kruger. "A survey of advances in vision-based human motion capture and analysis." CVIU 104.2 (2006): 90-126.
Zhu, Zhiwei, and Qiang Ji. "Eye and gaze tracking for interactive graphic display." Machine Vision and Applications 15.3 (2004): 139-148.
Bowyer, Kevin W., Kyong Chang, and Patrick Flynn. "A survey of approaches and challenges in 3D and multi-modal 3D+ 2D face recognition." CVIU 101.1 (2006): 1-15.
Allen, Brett, Brian Curless, and Zoran Popović. "The space of human body shapes: reconstruction and parameterization from range scans." ACM TOG. vol 22. No. 3. ACM, 2003.
Turaga, Pavan, et al. "Machine recognition of human activities: A survey." Circuits and Systems for Video Technology, IEEE Transactions on 18.11 (2008): 1473-1488.
Laxman, Srivatsan, and P. Shanti Sastry. "A survey of temporal data mining." Sadhana 31.2 (2006): 173-198.
Koperski, Krzysztof, Junas Adhikary, and Jiawei Han. "Spatial data mining: progress and challenges survey paper." Proc. ACM SIGMOD Workshop, Montreal, Canada. 1996.

* cited by examiner

LOCATION 1 — 671

| TRAFFIC COUNT (INTEGER) | | DEMOGRAPHICS | | | TOT |
|---|---|---|---|---|---|
| | | DEMO CLASS 1 | DEMO CLASS 2 | DEMO CLASS 3 | |
| EXPOSURE | EX1 | 104 | 396 | 500 | 1000 |
| | EX2 | 98 | 342 | 472 | 912 |
| | EX3 | 84 | 319 | 421 | 824 |
| ENGAGE | EN1 | 83 | 307 | 348 | 738 |
| | EN2 | 76 | 276 | 334 | 686 |
| | EN3 | 56 | 218 | 248 | 522 |
| PURCHASE | P1 | 51 | 204 | 218 | 473 |
| | P2 | 49 | 158 | 169 | 376 |
| | P3 | 30 | 136 | 132 | 298 |

672

| CONVERSION RATIO (%) | DEMO. | | | TOT |
|---|---|---|---|---|
| | C1 | C2 | C3 | |
| CR1 | 94 | 86 | 94 | 91 |
| CR2 | 86 | 93 | 89 | 90 |
| CR3 | 99 | 96 | 83 | 90 |
| CR4 | 92 | 90 | 96 | 93 |
| CR5 | 74 | 79 | 74 | 76 |
| CR6 | 91 | 94 | 88 | 91 |
| CR7 | 96 | 77 | 78 | 79 |
| CR8 | 61 | 86 | 78 | 80 |

Fig. 11

LOCATION N — 673

| TRAFFIC COUNT (INTEGER) | | DEMOGRAPHICS | | | TOT |
|---|---|---|---|---|---|
| | | DEMO CLASS 1 | DEMO CLASS 2 | DEMO CLASS 3 | |
| EXPOSURE | EX1 | 230 | 536 | 234 | 1000 |
| | EX2 | 227 | 494 | 213 | 934 |
| | EX3 | 225 | 453 | 209 | 887 |
| ENGAGE | EN1 | 213 | 111 | 200 | 524 |
| | EN2 | 209 | 103 | 198 | 510 |
| | EN3 | 203 | 87 | 188 | 478 |
| PURCHASE | P1 | 176 | 21 | 45 | 242 |
| | P2 | 134 | 5 | 15 | 154 |
| | P3 | 94 | 2 | 2 | 98 |

674

| CONVER-SION RATIO (%) | DEMO. | | | TOT |
|---|---|---|---|---|
| | C1 | C2 | C3 | |
| CR1 | 99 | 92 | 91 | 93 |
| CR2 | 99 | 92 | 98 | 95 |
| CR3 | 95 | 25 | 96 | 59 |
| CR4 | 98 | 93 | 99 | 97 |
| CR5 | 97 | 84 | 95 | 94 |
| CR6 | 87 | 24 | 24 | 51 |
| CR7 | 76 | 24 | 33 | 64 |
| CR8 | 70 | 40 | 13 | 64 |

Fig.12

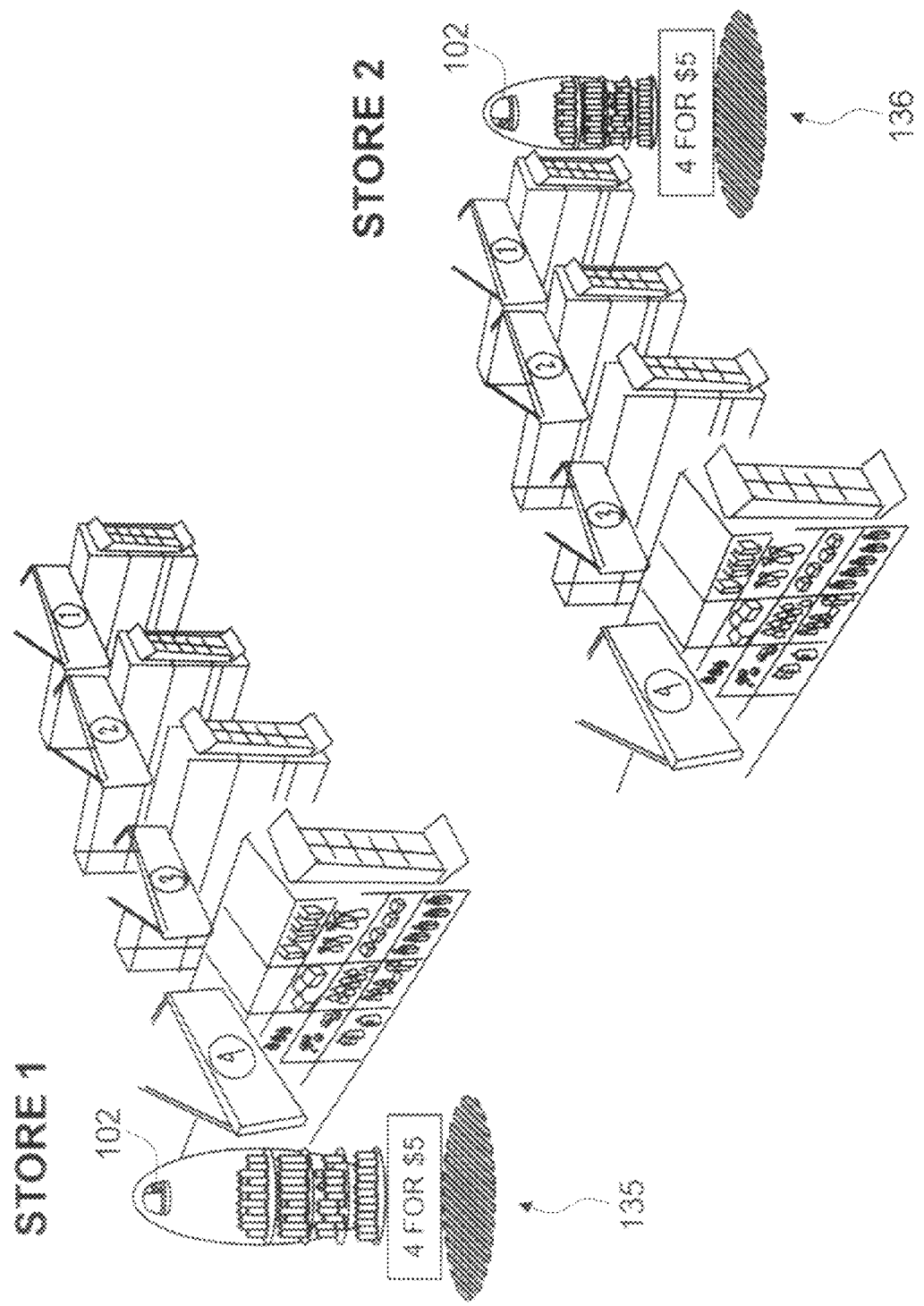

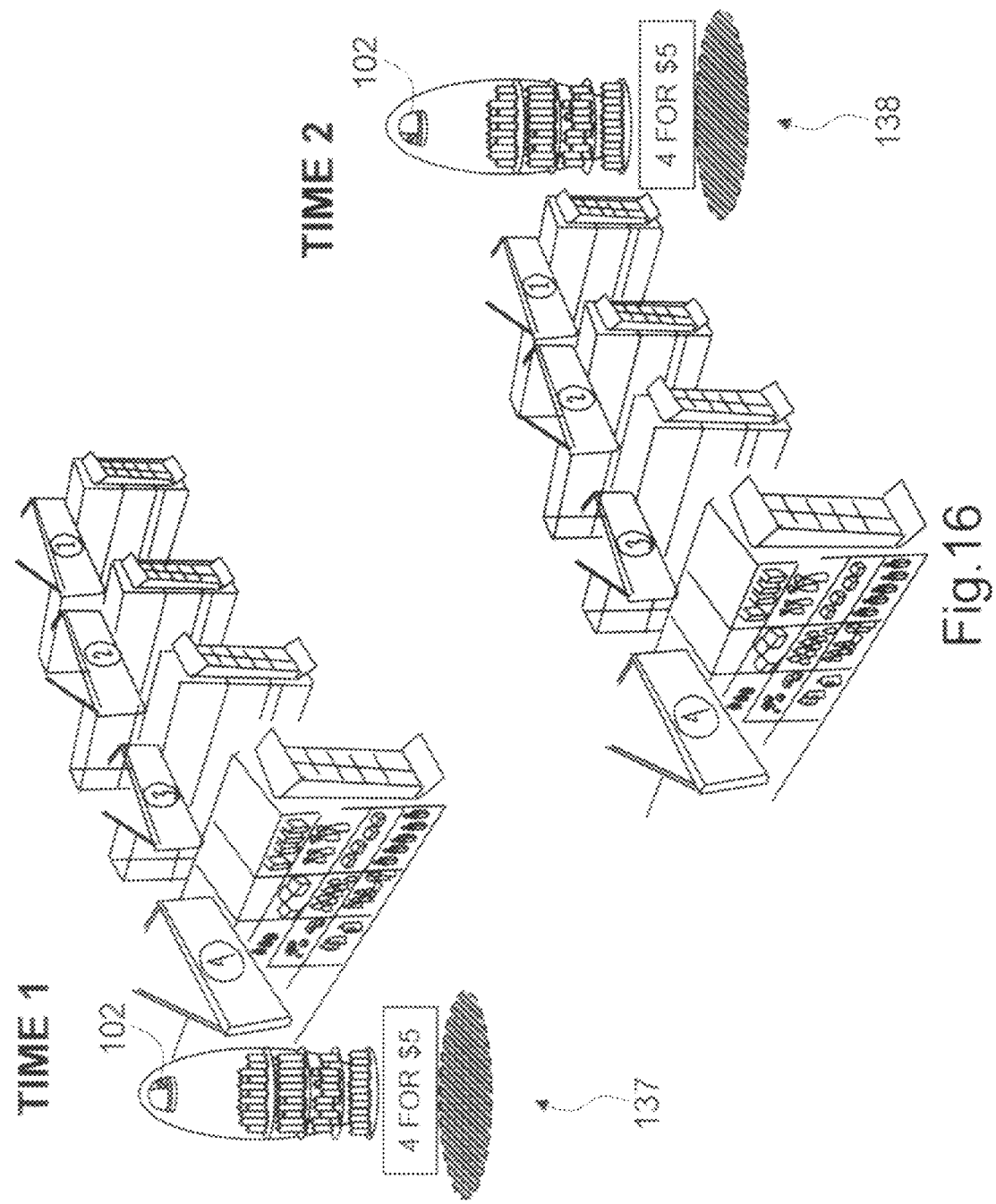

METHOD AND SYSTEM FOR MEASURING IN-STORE LOCATION EFFECTIVENESS BASED ON SHOPPER RESPONSE AND BEHAVIOR ANALYSIS

CROSS-REFERENCE TO RELATED APPLICATIONS

This patent application is a continuation in part of U.S. patent application Ser. No. 12/154,884, filed May 28, 2008.

FEDERALLY SPONSORED RESEARCH Not Applicable

SEQUENCE LISTING OR PROGRAM Not Applicable

BACKGROUND OF THE INVENTION—FIELD OF THE INVENTION

The present invention is a method and apparatus for evaluating the effectiveness of at least an in-store location of display within at least a store based on behavior analysis of people with respect to the display in the location, (1) capturing various attributes of the people in the location by a plurality of means for generating sensor measurements, such as cameras and mobile device signal detectors, (2) constructing a set of representation of the people's state vis-à-vis the environment in terms of the types and degrees of interactions by processing the input sensor measurements (e.g., images) in order to analyze the behavior of the people in response to the display in the location, and (3) comparing the behavior response to the display with another behavior response.

BACKGROUND OF THE INVENTION

The following prior arts employ alternative technologies, like Radio Frequency Identification (RFID), for determining the effectiveness of various in-store elements, but they do not make a reference about determining the effectiveness of product locations in a retail environment.

U.S. Pat. No. 6,598,025 of Hamilton, et al. disclosed an inventory management system that includes data collection terminals for acquiring product-identification data, product-placement data and sales data. The system also includes a database which is being queried to identify the relationships between product sales and placement.

U.S. Pat. 20060277104 of Overhultz, et al. described systems and methods for measuring the effectiveness of an advertising display, but not necessarily evaluating the effectiveness of various product locations, by employing an RFID tag, receivers that receive the signal from the tag, and processors that receive sales data from the retail environment.

The present invention differs from the above inventions in its ability to not only provide information on the number of products purchased from each location, but also to identify the types of behavior exhibited in front of each location. This evaluation will provide an accurate picture of the effectiveness of each location in influencing shopper behavior.

The following patents describe prior attempts at location tracking, more specifically tracking of individuals within physical spaces, like customers within a retail establishment.

U.S. Pat. No. 6,563,423 of Smith disclosed a location tracking system to track the movements of customers. An electronic tagging method and apparatus apply an electronically-readable tag that is magnetized with an electronically-readable code, unique to each individual, to a customer's footwear. The location of each electronically-tagged customer is tracked using a number of sensors disposed at multiple locations within the establishment. This tracking is then used to determine a customer's pace, how long a customer stayed at a particular location, and to determine how many customers passed a location. The purchase of a customer is determined by reading the tagged code at the time of purchase and relating this to whether the customer visited the display earlier.

Smith's method of linking purchases to a particular location can be faulty, especially in instances when a customer visits multiple displays of the same product. Smith's method cannot accurately pinpoint the location from which the customer picked up the product, since the shopper's behavior is not captured at each and every location. The method can be more appropriate for tracking the traffic flow within a retail establishment, but cannot be employed for determining the effectiveness of a product location in influencing shopper behavior and motivating the shopper to make a purchase. However, the present invention will provide an accurate assessment of the effectiveness of a product location in influencing a shopper to make a purchase, in addition to determining behaviors exhibited in the location.

U.S. Pat. 20060015408 of Brown describes a product purchase and sales tracking system comprising an RFID tag that is being placed on a product to be tracked, two RFID readers detecting the purchase of the product from the point of purchase and generating a time stamp, and at least one tracking server programmed to identify in real time the purchase of the product.

However, this system cannot provide information on the types of behavior exhibited in front of a location, even though it claims to provide information on the number of products purchased from each promotional display, special display, and end cap for the same product.

On the contrary, the present invention will not only provide information on the number of products purchased from each product location, but will also identify the types of behavior exhibited in front of each location. Further, the ability of each location to attract, engage, and motivate shoppers to make a purchase will be identified, and the locations will be ranked based on their effectiveness to influence shoppers along these stages. Moreover, the different demographic and trip type segments of shoppers that shop each of the locations will be identified, thus providing a complete picture of the effectiveness of a location in influencing various shopper segments.

U.S. Pat. No. 6,659,344 B2 of Otto, et al. disclosed a system for automated monitoring of items selected by shoppers in a retail environment using RFID technology. This invention determines the effectiveness of a display by determining the number of shoppers that purchased from it as opposed to another display for the same product. However, this invention does not deliver any information on the types of behavior exhibited in front of a location, thus providing only a partial picture of the effectiveness of a location. On the contrary, the present invention fills the gap by providing comprehensive information on the types of behavior exhibited in front of each product display location in addition to delivering purchase information.

U.S. Pat. 20080005045 A1 of Sorensen, et al. disclosed a system and method to analyze shopper data from various shopping environments for determining the exposure ratings of media such as product advertisements and displays. The measures evaluated to arrive at exposure ratings were shopper density, shopper flow, and transaction information. Sorensen's method may be good for determining the exposure of a media such as a display, but cannot be employed for determining its effectiveness, since the method does not take into account the types of behavior exhibited in front of the locations. On the contrary, the present invention determines the effectiveness of a location by evaluating not only shopper flow and purchase information, but also identifying the types of behavior exhibited in front of each location.

SUMMARY

Manufacturers are increasingly focusing on influencing shoppers in retail stores to purchase their brands through innovative marketing and merchandising strategies. One such ubiquitous approach to attract impulse shoppers or infrequent category buyers to purchase or even consider a particular brand at the shelf is through a marketing display in high traffic areas such as lobbies, end caps, power aisles, or perimeter areas of a retail store. Manufacturers consider these displays as vital vehicles to not only drive product sales, but also to inform, educate, and entertain shoppers. However, the effectiveness of these displays in influencing shopper behavior is not clearly understood due to the lack of measurements and tools.

The present invention aims to fill the gap by measuring shopper responses to various in-store marketing and merchandising displays, such as message displays, end caps, and counter displays, in various locations.

The present invention measures the effectiveness of any in-store marketing display through automated and semi-automated shopper behavior analysis based on multiple types of sensory measurements that may involve various types of signal processing and computer vision technologies. This provides for a systematic evaluation of shopper responses to various display locations within the store.

In an exemplary embodiment of the present invention, shopper responses to any in-store marketing display location will be characterized by a conversion rate from a shopper interaction stage to another among the following stages: Visit, Reach, Expose, Visual Engage, Physical Engage, and Purchase. Such shopper response constructs the shopper interaction funnel, consisting of Visit-to-Reach, Reach-to-Expose, Expose-to-Visual Engage, Visual-to-Physical Engage, and Engage-to-Purchase rates. This evaluation will help to determine the performance of a display location in influencing shopper behavior.

To perform such evaluation, the present invention divides the entire system into three layers: sensing layer, information representation layer, and the location effectiveness estimation layer. The sensing layer represents a channel of sensing/capturing various direct measurements of people from different dimensions, including color and depth images of the people, biometric signals of the people, and the wireless signals of the mobile device that the people may carry. The information representation layer then extracts a higher-level attributes of the shoppers based on the direct measurements from various sensing devices, which include location, velocity, body posture, gaze, demographics and biometrics through appropriate sensor/data fusion and signal/vision processing. By integrating environmental parameters such as store layout and planogram, the people's visual attention and physical interaction can be identified in terms of the item of interest of the people and the degree of the interaction. By measuring the impression level, the system can also directly measure the shopper's response to a specific retail element.

All the aforementioned attributes of people may be encoded and further analyzed in terms of the shopping activities with respect to the environmental parameters such as retail elements on the shelf. The encoded shopper attributes may be stored in the trip database for online/offline processing in different contexts.

In the location effectiveness estimation layer, the provided or stored attributes of people are processed to extract higher-level inferences or trends in a large-scale data domain through Big Data processing or semi-automatic processing.

Based on the aforementioned methods, the present invention can identify the display location's influence on different demographic shopper segments, based on gender, age, and ethnicity, with their varied shopping trip missions—quick, special occasion, fill-in, and stock-up. This will help to identify the appeal of each of the display locations to the various segments of shoppers.

The present invention can also determine the different types of behavior exhibited in front of each display location. The types of behavior will include shopper velocity, shopping time in front of the display, destination points, and dominant direction of entry. Such granular understanding of the behaviors in front of a display location will help to determine its effectiveness in a clear and concise manner.

The present invention can also rank the different display locations for the same product based on their performance, thereby identifying the most effective and least effective locations for influencing shopper behavior. It is an objective of the present invention to determine an in-store location that is most effective for a particular parameter such as a particular product, brand, demographic segment, and time-period, or a combination of such parameters, for example, a particular brand for a particular demographic segment during a particular season. The evaluation can comprise a relative performance comparison of the locations.

This will help to improve the performance of the entire portfolio of locations for the product by weeding out the least effective locations that do not meet the objectives of the manufacturer. In addition, the ranking will help to determine the optimal set of locations for a product that is capable of improving the overall performance.

The present invention can also evaluate the locations either sequentially or in parallel through a monadic research design for determining their effectiveness.

- A sequential monadic research evaluation will involve testing all display locations for a product in the same retail store during different time periods. After evaluating one location for a particular time period, for example one week, the next location will be tested. Appropriate care will be taken to ensure that the time period does not have any other variation, like changes in the promotional activity and price of the product or the type of display.
- A parallel monadic research evaluation will involve testing all display locations for a product during the same time period.

In instances where a product has only one location in the store, the present invention can measure shopper responses to that location. After the evaluation, the product can be moved to another location in the store to determine shopper responses to the new location. This evaluation will help to identify the most effective location for the product based on shopper responses.

In the present invention, the display comprises product display, marketing display, signage display, merchandize, category, and packaging in the present invention. The behavior analysis comprises traffic in the vicinity of the display, dwell time, conversion ratio, purchase event, and other responses, in the locations.

It is an objective of the present invention to maintain all controllable parameters pertaining to the display to be the same. The controllable parameters comprise promotion, price, advertising activity, design of the products, and marketing element. While maintaining the controllable parameters to be the same, through the changes in the display in the location, the present invention measures the effect of the changes among the locations. The present invention generates a series of estimations of various retail metrics by performing demographic analysis in addition to the behavior analysis, including traffic count per demographics, dwell time per demographics, and purchase event per demographics.

DRAWINGS—FIGURES

Figure 10:
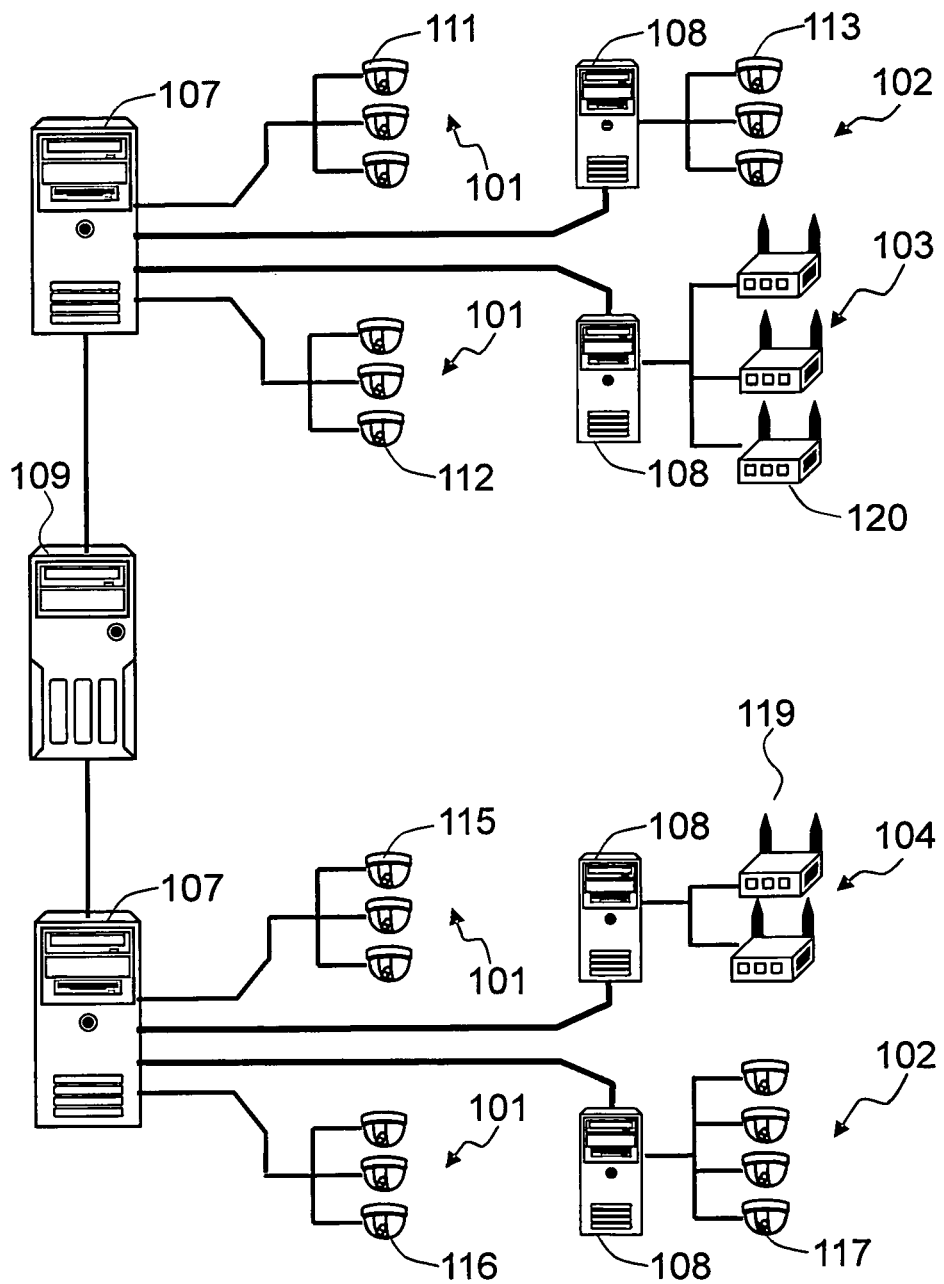

FIG. 10 shows an exemplary network of a plurality of means for control and processing and a plurality of means for capturing sensor measurements (e.g., images and mobile device signals) in the present invention, where the network consists of a plurality of first means for control and processing 107 and a plurality of second means for control and processing 108, which communicate with each other to synchronize the time-stamped lists of sensor measurements in the measured locations.

FIG. 11 shows a "first exemplary matrix for traffic count" 671 and a "first exemplary matrix for conversion ratio" 672 based on the first traffic count matrix, where the matrices are used to measure the location effectiveness for a location, e.g. "LOCATION 1."

FIG. 12 shows a "second exemplary matrix for traffic count" 673 and a "second exemplary matrix for conversion ratio" 674 based on the second traffic count matrix, where the matrices are used to measure the location effectiveness for another location, e.g. "LOCATION N."

Figure 13:
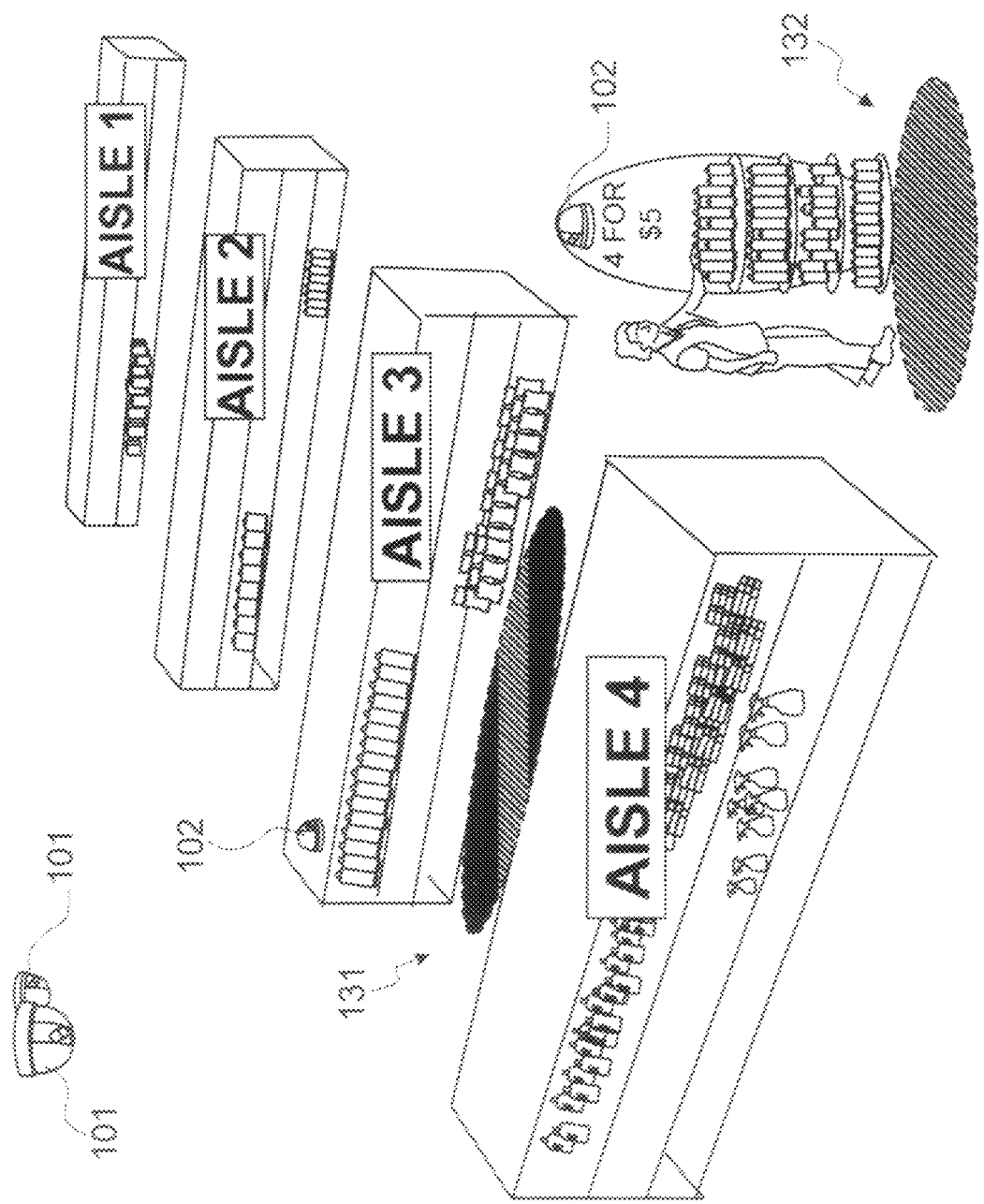

FIG. 13 shows an exemplary shopper interaction with one of the merchandise locations, such as "location 1" 131 and "location 2" 132, for a product, such as a shampoo product, in which the interaction measurement by the present invention can be used to evaluate the location effectiveness.

Figure 14:
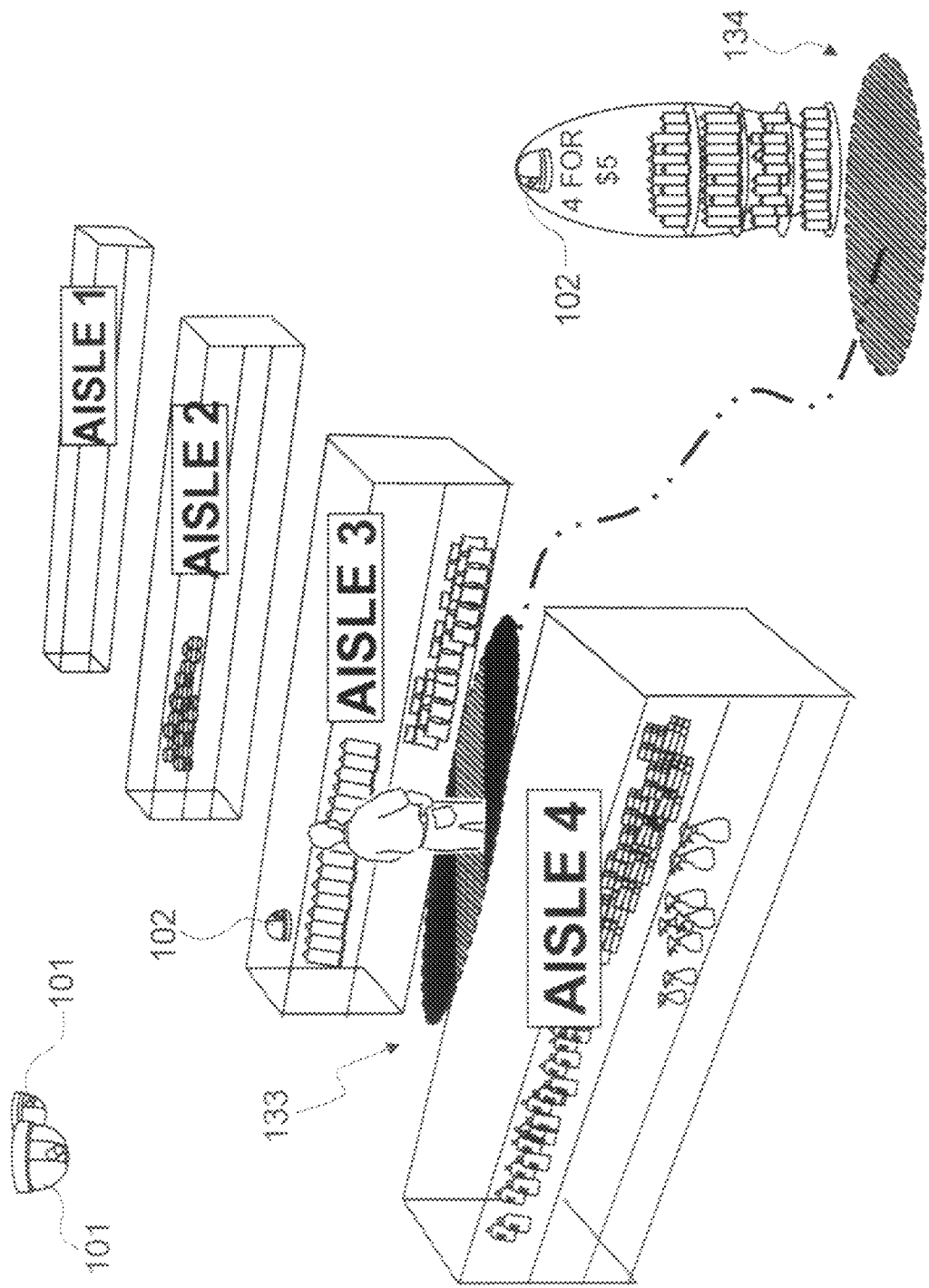

FIG. 14 shows an exemplary shopper interaction with one of the merchandise locations, such as "location 3" 133 and "location 4" 134, for a product, such as a shampoo product, in which the interaction measurement by the present invention can be used to evaluate the location effectiveness.

FIG. 15 shows an exemplary parallel monadic research evaluation process in the present invention, wherein two different display locations, such as "location 5" 135 and "location 6" 136, for a product are evaluated in two individual retail stores during the same time period.

FIG. 16 shows an exemplary sequential monadic research evaluation process in the present invention, wherein the same display for a product is placed in two different regions of the store, such as "location 7" 137 and "location 8" 138, and evaluated during two different time periods.

DETAILED DESCRIPTION OF THE INVENTION

Figure 1:
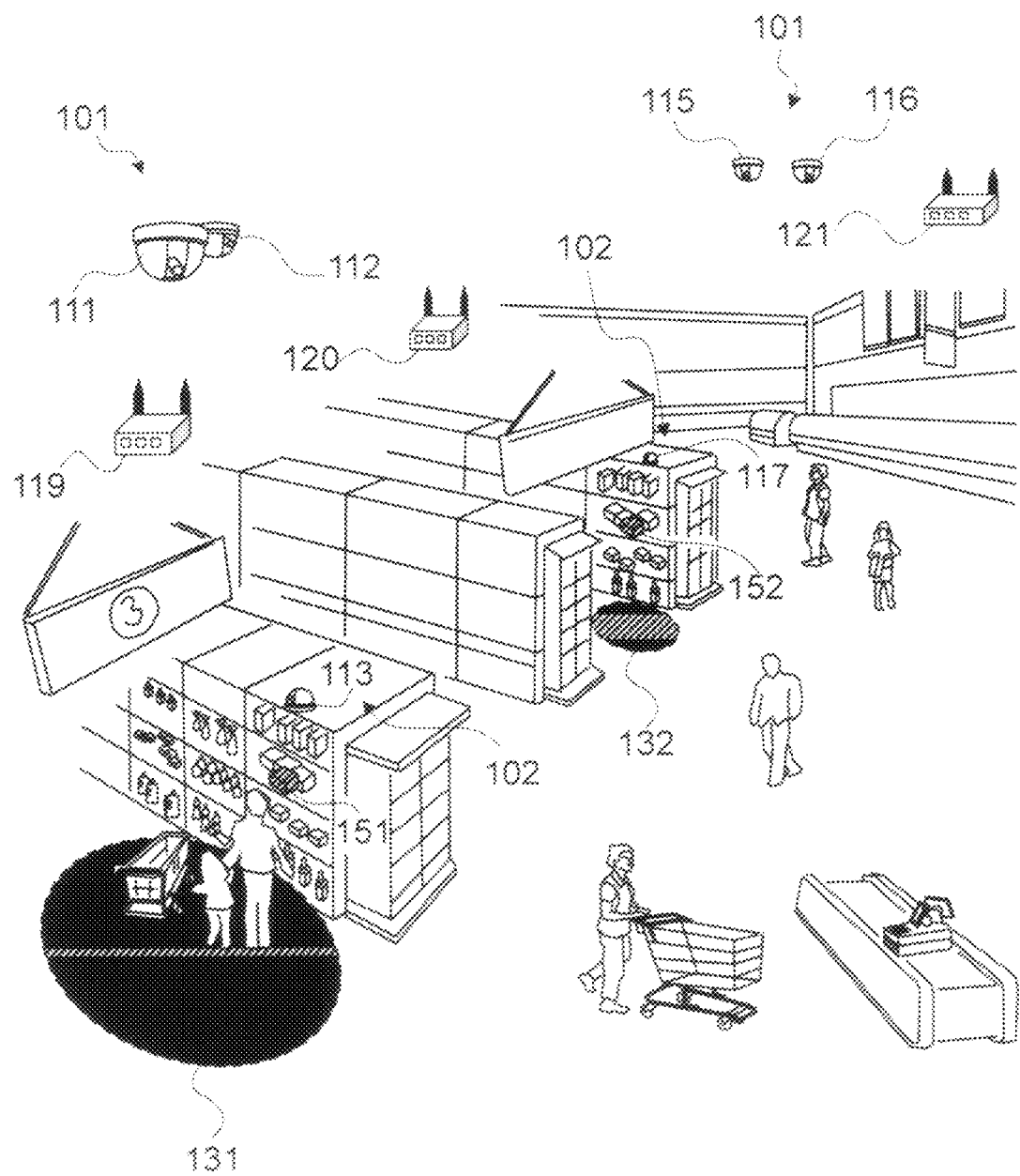
FIG. 1 shows an overview of an application where an exemplary embodiment of the present invention is applied.

FIG. 1 shows an overview of an application where an exemplary embodiment of the present invention is applied. The present invention is a method and apparatus for evaluating the effectiveness of at least a location of display within at least a store based on behavior analysis of people with respect to at least a display in the locations.

The present invention captures a plurality of aspects of the people (e.g., location, velocity, body posture, etc.) in the location by a plurality of means for generating sensor measurements such as sensors and cameras. The sensors may be in various modalities with various types, which may comprise at least a "first means for capturing images" 101 that are used for top-down view, at least a "second means for capturing images" 102 that are used for the frontal view of the people, at least a wireless signal detector 103 that can detect signals transmitted from mobile devices carried by people in the environment. The top-down "first means for capturing images" 101 is used for tracking the people and counting the traffic, spatial movement, and temporal attributes of the tracking. The frontal "second means for capturing images" 102 is used for measuring more detailed information of the people, such as the demographics, the body posture, and further the level of impression of the people.

In the exemplary application of the present invention shown in FIG. 1 for a "location 1" 131, a plurality of the "first means for capturing images" 101, such as the "means for capturing images 1" 111 and the "means for capturing images 2" 112, are installed on the ceiling for the top-down view, at least a "second means for capturing images" 102, such as the "means for capturing images 3" 113, is installed for the frontal view, and a plurality of wireless signal detectors 103 are installed.

Likewise, for a "location 2" 132, a plurality of the "first means for capturing images" 101, such as the "means for capturing images 5" 115 and the "means for capturing images 6" 116, are installed on the ceiling for the top-down view, at least a "second means for capturing images" 102, such as the "means for capturing images 7" 117, is installed for the frontal view, and a plurality of wireless signal detectors 119 are installed.

The plurality of input images and sensed signals is processed in order to analyze the behavior of the people in response to the display in the location. Based on the processed result, the present invention evaluates the effectiveness of the location by comparing the behavior response with at least another behavior response. The other behavior response can be a response to at least another display or to the same display, depending on the location configuration.

In the present invention, "location" is defined as a logical entity that comprises at least a physical space in a store in the present invention. In the exemplary application of the present invention shown in FIG. 1, the "location 1" 131 and "location 2" 132 show the exemplary in-store regions that are measured for the effectiveness based on the location configuration plans.

The "display" comprises product display and marketing display, signage display, merchandize, category, and packaging. The behavior analysis comprises generation of data about traffic in the vicinity of the display, dwell time, conversion ratio, purchase event, visual/physical interaction with the display, shopping activity (e.g., label reading, item holding, comparing, smelling, etc.) with regard to the display, and other responses in the locations (e.g., emotion evaluation, impression analysis, etc.).

In the process of measuring the location effectiveness, the present invention maintains all controllable parameters pertaining to the display in the locations to be the same. The controllable parameters comprise promotion, price, advertising activity, design of the products, and marketing element. While maintaining the controllable parameters to be the same, through the changes in the display in the location, the present invention measures the effect of the changes among the locations.

Through the outcomes of the effectiveness measurement in each location, the present invention calculates an in-store location that is most effective for a particular display based on the evaluation of the locations. The evaluation can comprise a relative performance comparison of the locations.

As part of the outcomes, the present invention generates estimation on various retail metrics based on the location-sensitive measurement. The location-sensitive measurement comprises demographic analysis in addition to the behavior analysis, including traffic count per demographics, dwell time per demographics, visual/physical interaction per demographics, and purchase event per demographics.

The present invention compares the effectiveness of different locations synchronously or a plurality of the effectiveness of each location in different times.

Figure 2:
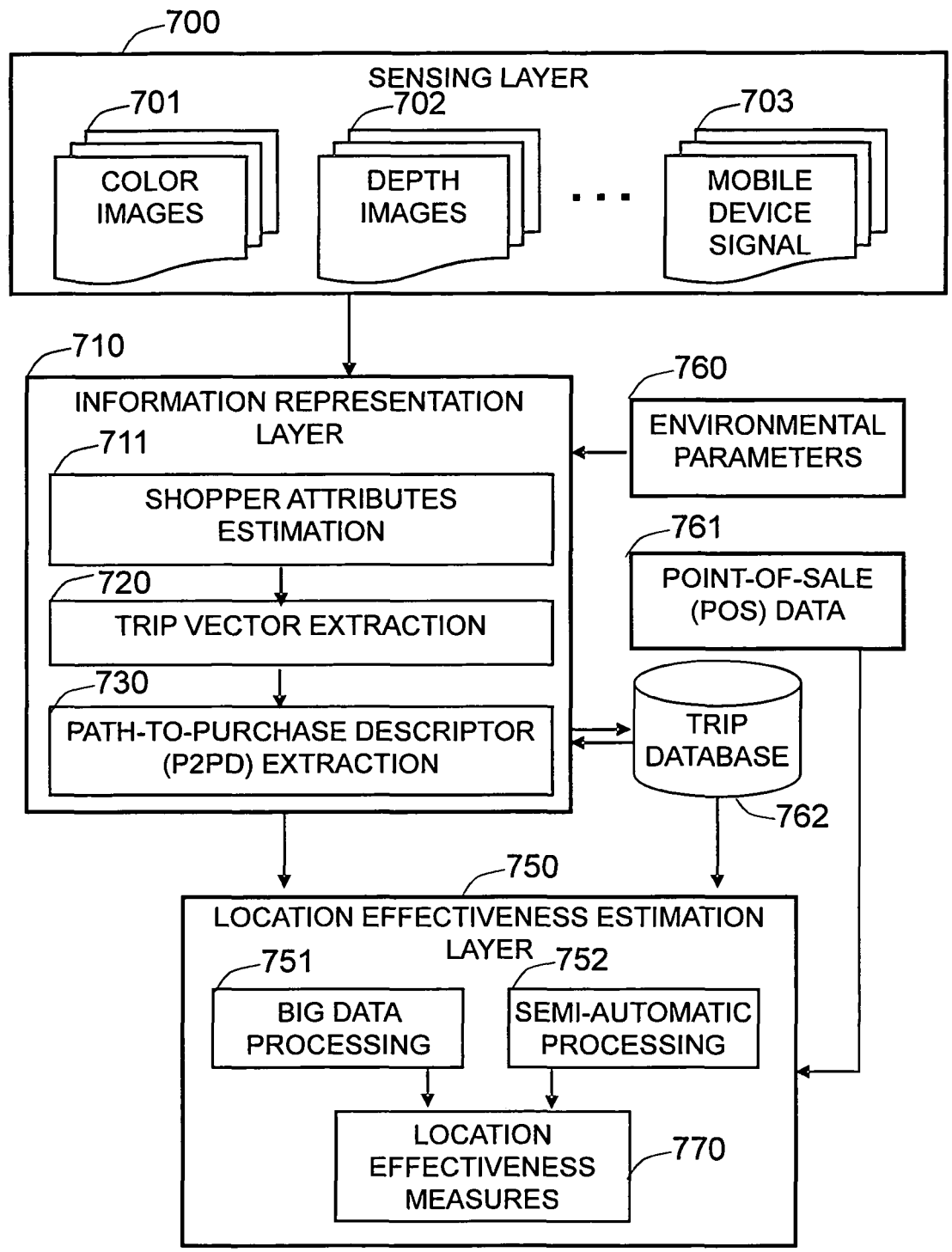
FIG. 2 shows the overall system for measuring in-store location effectiveness of displays in different locations.

FIG. 2 shows the overall system for measuring in-store location effectiveness of displays in different locations. The system consists of three different layers: sensing layer 700, information representation layer 710, and location effectiveness estimation layer 750. The sensing layer 700 defines and provides a set of channels of capturing measurements on the physical objects including shoppers in the retail stores. The sensing layer may contain various sensors in multiple modalities including proximity sensors for presence information, cameras for color images 701, microphones for audio, infra-red (IR) cameras for depth images 702, and wireless signal detectors for mobile device signals 703. The wireless signal detectors may be able to detect Bluetooth or Wi-Fi signals that are emitted from mobile devices that shoppers may carry. Various types of such sensors may be deployed in the retail stores, which may be embedded in the environment such as walls for unobtrusive monitoring of shoppers in different locations from different dimensions. Such a plurality of various sensors are networked together and provide multiple streams of measurements to the system. All the measurements may be forwarded and gathered in a plurality of locations for subsequent processing.

Given all the measurements, the information representation layer 710 processes the measurements to extract a meaningful contextual representation of the objects of interest (e.g. shoppers in the retail stores). The information representation layer consists of three modules: shopper attributes estimation 711, trip vector extraction 720, and path-to-purchase descriptor (P2PD) extraction 730. In the shopper attributes estimation 711 module, measurements for the same shopper are aggregated and analyzed together to estimate various attributes of shoppers including location, velocity, body posture, demographics, and biometrics. In the trip vector extraction 720 module, the extracted shopper attributes are interpreted with the environmental parameters such as the store layout and the planogram (i.e., the map of the brand, product, and category within a retail store) to represent the shoppers' state in a contextual form. Note that the contextual form here indicates the shopper's experience with regard to the retail elements such as the displays in different locations. Such contextual representation is encoded in the form of the Trip Vector (TV), which will be described in FIG. 3 in more detail.

The trip vector is intended to a shopping experience representation in such a way that it can comprehensively reconstruct the shopping trip of shoppers at consecutive time frames so that all the further shopper behavior analysis can be performed solely based on this representation without processing the raw signals and images.

The extracted TVs will be stored in a trip database 762 for offline processing as well as streamed to higher level modules for online processing.

The extracted TVs may be processed further in a more summarized and simplified form in terms of events of interest. A set of events of interest may be defined by the application—in this patent application, the application is the in-store location effectiveness measurement; however, it could be a different application—such as the abrupt velocity or direction change, visual/physical interaction with retail elements, and other salient motions (e.g., U-turns). The summarized TVs are encoded as a series of higher-level shopping descriptors, referred to as the Path-to-Purchase Descriptor (P2PD). If we think of the entire set of TVs for a shopping trip of a shopper as a movie, for example, the P2PDs could be thought of as a trail of the movie that contains all the interesting scenes with meta-data such as labels and subscripts. The added meta-data may include shopping activities that can be understood only in a broader time period (e.g., the activities of product comparison or wandering cannot be captured by processing measurements made at a single time instance).

Based on the information representation of the shopping trips, the location effectiveness estimation layer 750 generates the pre-defined location effectiveness measures 770 by automatic Big Data processing 751 or semi-automatic processing 752 that entails some amount of manual processing by human operators. The pre-defined location effectiveness measures 770 may include various in-store traffic information and the conversion rates among the shopping stages mentioned earlier. Such pre-defined location effectiveness measures 770 may be analyzed in different dimensions including product, brand, demographic segment, and time. For example, the system may generate estimation on the location effectiveness of a particular product for a particular demographic segment during a certain season or time period. The dimensions may be combined together to define a narrower space to be analyzed by the Big Data processing 751 or semi-automatic processing 752 module to extract more targeted trends or unique characteristics.

Such location effectiveness estimation may also be performed with the point-of-sale (POS) data 761 to correlate any trend with the actual purchase history. The location effectiveness estimation may be performed only for the shoppers who are present within the retail store by processing data in real-time. It may be also processed based on the recorded data in the trip database 762 offline for long-term analysis. The two types of processing model may be performed together to make comparison between short- and long-term location effectiveness and trends.

Figure 3:
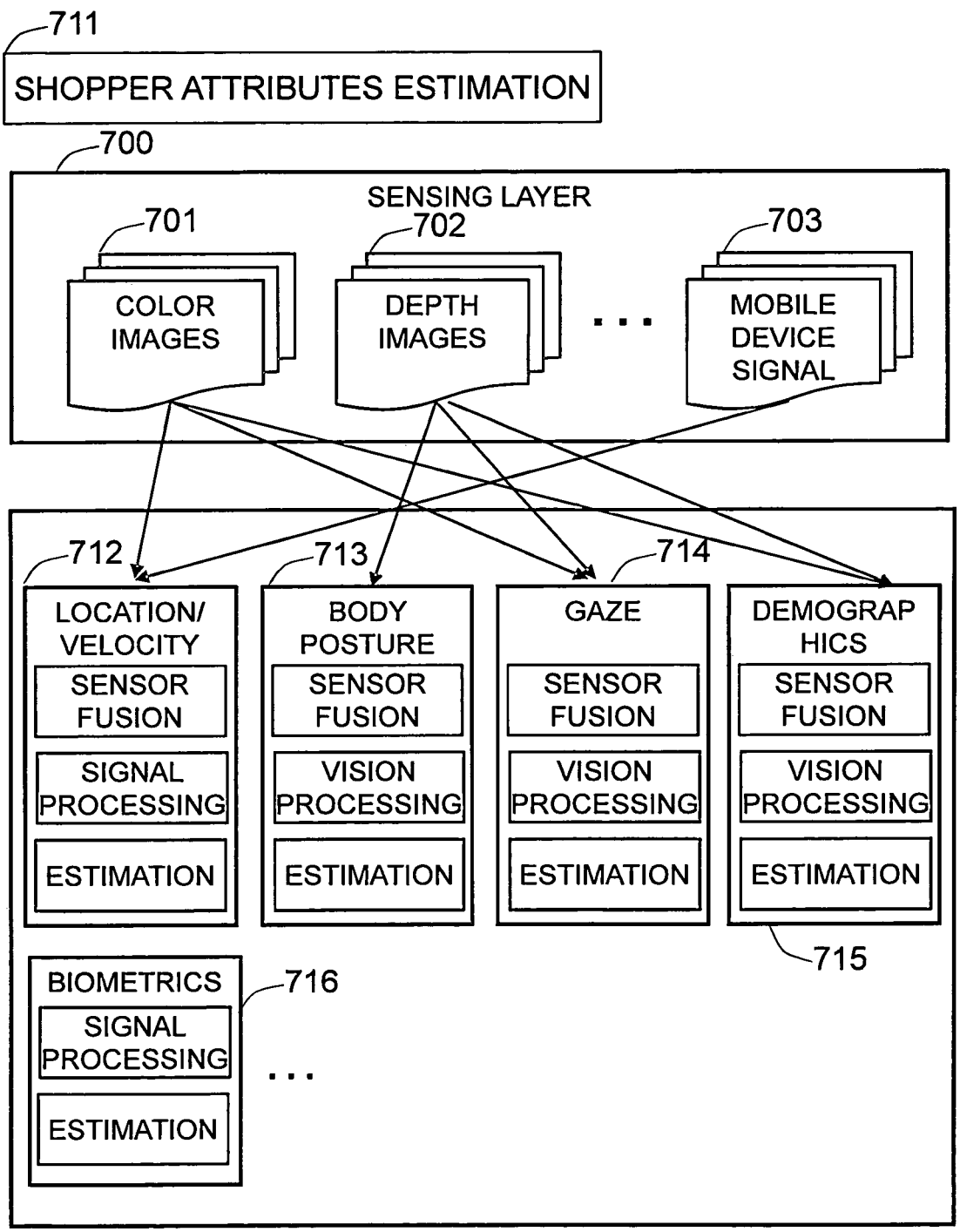
FIG. 3 shows the detailed processes within the shopper attributes estimation module for extracting various attributes of shoppers from various types of sensors.

FIG. 3 shows the detailed processes within the shopper attributes estimation 711 module for extracting various attributes of shoppers from various types of sensors. Exemplary shopper attributes may include the location/velocity 712, body posture 713, gaze 714, demographics 715, and biometrics 716. Estimation of different attributes of a shopper usually requires measurements from different sets of sensors. Assuming color images 701, depth images 702, and mobile device signals 703 are provided from the sensing layer 700, for example, the location and velocity of a shopper may be estimated by aggregating the location estimation result from a plurality of color images 701 that are captured at a time instance and the location estimation result from a plurality of mobile device signals 703 detected at the similar time instance through sensor and data fusion. Estimation of the location and velocity of a shopper based on color images may entail a series of image processing and computer vision processing including background segmentation, feature extraction (e.g., color histogram, histogram-of-oriented gradients (HoG), SIFT, SURF, etc.), blob detection, object tracking using statistical estimation algorithms including Kalman filter and Particle filter. Estimation of the location and velocity of a shopper based on mobile device signals may entail one of various indoor tracking technologies based on Bluetooth, Wi-FI, or Cellular signals [Liu, Hui, et al. "Survey of wireless indoor positioning techniques and systems."*Systems, Man, and Cybernetics, Part C: Applications and Reviews, IEEE Transactions on* 37.6 (2007): 1067-1080.] using statistical estimation algorithms for signal triangulation and trilateration [Gu, Yanying, Anthony Lo, and Ignas Niemegeers. "A survey of indoor positioning systems for wireless personal networks." *Communications Surveys & Tutorials, IEEE* 11.1 (2009): 13-32.]. Two different location estimates (i.e., image- and mobile device signal-based estimates) may again be aggregated by employing a sensor fusion algorithm including Kalman/Particle filter and others [Yilmaz, Alper, Omar Javed, and Mubarak Shah. "Object tracking: A survey."*Acm Computing Surveys (CSUR)* 38.4 (2006): 13.].

The present invention can utilize any reliable video-based tracking method for a single customer and a group of customers in the prior art, in regard to the behavior analysis. For example, U.S. patent application Ser. No. 11/901,691 filed on Sep. 18, 2007 of Sharma, et al. (hereinafter Sharma Ser. No. 11/901,691) disclosed an exemplary process of video-based tracking and behavior analysis for a single customer or a group of customers, using multiple means for capturing images in a preferred embodiment of the invention, based on the spatial and temporal attributes of the person tracking.

Estimation of the body posture 713 of shoppers may be carried out by aggregating a plurality of depth images 702 from different angles. The body posture 713 may be represented by a human skeleton model with the relative location of head, torso, and limbs with their relative angles [Knoop, Steffen, Stefan Vacek, and Rüdiger Dillmann. "Sensor fusion for 3D human body tracking with an articulated 3D body model." *Robotics and Automation, 2006. ICRA 2006. Proceedings 2006 IEEE International Conference on.* IEEE, 2006. And Moeslund, Thomas B., Adrian Hilton, and Volker Kruger. "A survey of advances in vision-based human motion capture and analysis." *Computer vision and image understanding* 104.2 (2006): 90-126.]. Gaze 714 of shoppers may be estimated by detecting and localizing the face, eyes, and pupils, consecutively based on a plurality of color and depth images taken at a similar time instance [Zhu, Zhiwei, and Qiang Ji. "Eye and gaze tracking for interactive graphic display." *Machine Vision and Applications* 15.3 (2004): 139-148.]. Demographics 715 information of the shoppers such as age, gender, and ethnicity may be identified using a plurality of color and depth images 702 with appropriate computer vision and image processing technologies such as face detection and tracking in 2D and 3D with machine learning technologies for classification of the input data among a large data set [Bowyer, Kevin W., Kyong Chang, and Patrick Flynn. "A survey of approaches and challenges in 3D and multi-modal 3D+2D face recognition." *Computer Vision and Image Understanding* 101.1 (2006): 1-15.] The present invention can utilize any reliable demographic composition measurement method in the prior art as an exemplary video-based segmentation of the people. For example, U.S. patent application Ser. No. 11/805,321 filed on May 23, 2007 of Sharma, et al. (hereinafter Sharma Ser. No. 11/805, 321) disclosed an exemplary demographic composition measurement based on gender and ethnicity.

In an embodiment, a plurality of sensors that can detect and receive biometrics 716 signals (e.g., EEG) of shoppers may be embedded in the environment, which may be coupled with the sensors that are attached to the shoppers. The received biometrics signals may undergo a series of signal processing, and the shoppers' biometrical state may be estimated.

Figure 4:
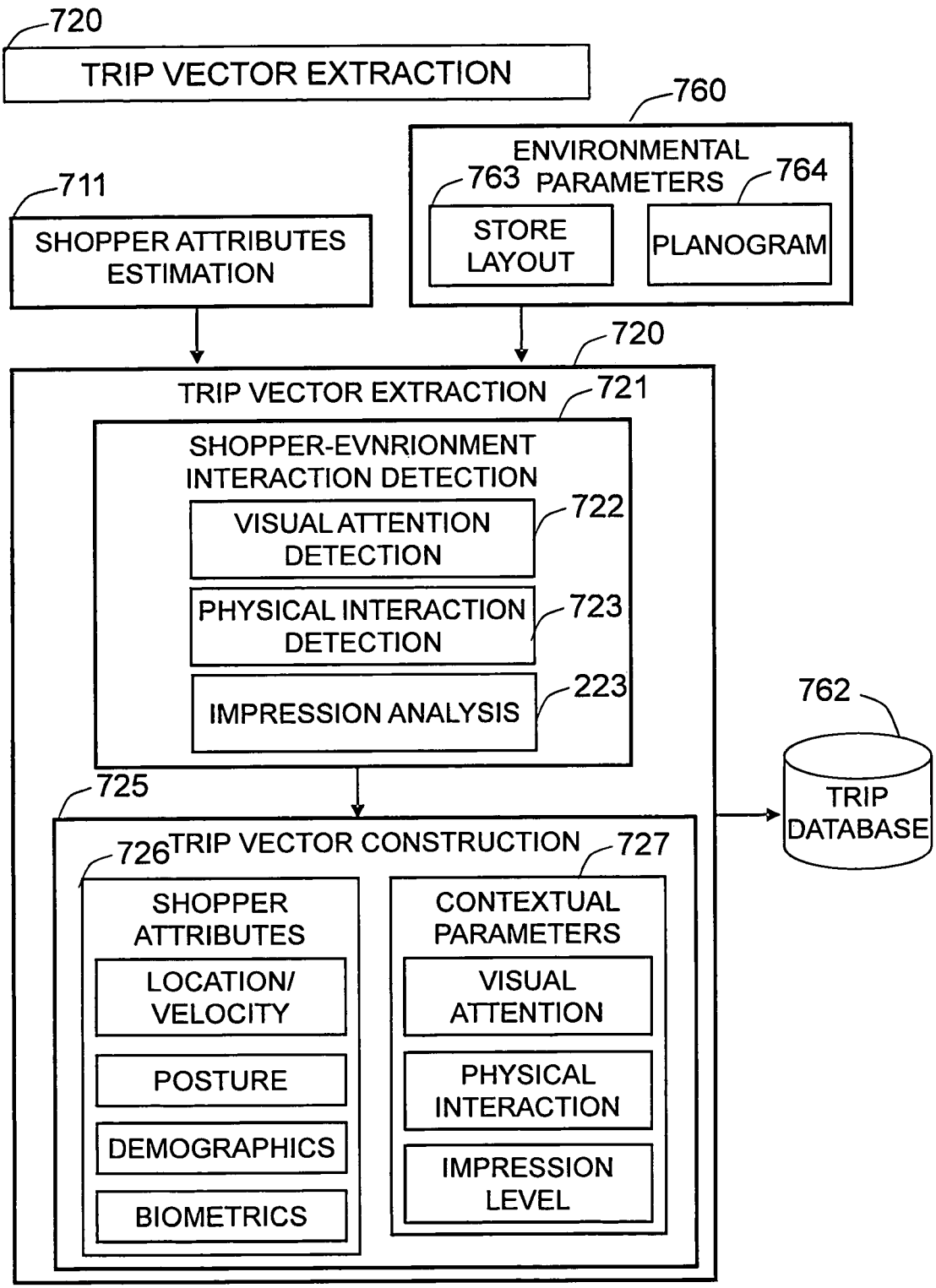
FIG. 4 shows how to extract the trip vectors based on the estimated shopper attributes and the environmental parameters, which describe the shopping experience of shoppers in consecutive time frames.

FIG. 4 shows how to extract the trip vectors based on the estimated shopper attributes and the environmental parameters, which describe the shopping experience of shoppers in consecutive time frames. Note that the shopper attributes 726 are the data only about the shopper without their contextual meaning in an environment. The trip vector (TV) is meant to describe the holistic shopping experience of shoppers at a given time instance. Thus, the TVs interpret the shopper attributes 726 in the context of the environment and also contain the interactions between shoppers and the environment (i.e. a retail store).

Given the shopper attributes 726 (e.g., location, velocity, body posture, and gaze) and the environmental parameters 760 (e.g., store layout 763 and planogram 764), the trip vector extraction 720 module consists of two sub-modules: the shopper-environment interaction detection 721 and the trip vector construction 725. In an embodiment, the shopper-environment interaction detection 721 module may contain three sub-modules: visual attention detection 722, physical interaction detection 723, and impression analysis 223. Visual attention detection 722 module estimates the item of interest that the shopper is currently interacting with. It is estimated based on the gaze of the shopper and the planogram 764 of the retail store. If a fixation of the shopper's gaze is detected, then it would imply that the shopper is visually interacting with a display. Then the display can be identified by localizing the intersection point between the gaze of the shopper and the planogram of the retail store. Physical interaction detection 723 module detects if there is a physical touch with a display and identifies what the display is. It is estimated based on the body posture of the shopper and the planogram 764 of the retail store. If any of hand reaches inside a shelf, for example, it would mean that the shopper is physically interacting with a display. The display can be identified by localizing the intersection of the hand and the planogram of the retail store.

Impression analysis 223 is carried based on color and depth images of the people in relation to the changes in location configurations to measure the attitudinal impact the change has on the people. With regard to the level of impression measurement, the present invention can utilize any well-known impression measurement method. U.S. patent application Ser. No. 11/818,554 filed on Jun. 14, 2007 of Sharma, et al. (hereinafter Sharma Ser. No. 11/818,554) disclosed details of a system for measuring the impression level through the viewership of people. An exemplary embodiment of the present invention shown in FIG. 4 can utilize Sharma Ser. No. 11/818,554 for the level of impression measurement in the impression analysis 223, especially utilizing the 3D facial pose estimation.

The impression analysis 223 measurement is very important to understand the location configuration's impact on the people who were exposed to it. The measurement can teach us to understand whether a location configuration had a better influence in leading people to an engagement with the display, such as a product display or marketing display, in the location and whether or not it was attractive enough to hold the attention of the people compared to other location configurations.

In an exemplary embodiment, the impression analysis module 223 can utilize other variables to measure the deeper level of impression. The other variables can comprise the relationship of the location configuration with the surrounding location configurations with regard to the demographic segmentations and temporal attributes. For example, a more than average number of impression counts for a location configuration in relation to a specific demographic group indicate that the location configuration was able to attract and engage the specific demographic group in a particularly meaningful pattern. Likewise, the impression count data can be analyzed to measure the impact on each predefined demographic group in relation to the location configuration. Each metric gives a measure of effectiveness of the location configuration as both whole and individual graphics. A location configuration that can attract more people and engage them longer can be considered better than the location configuration that does not.

Given all the shopper attributes and the shopper-environment interactions at a given time instance, the trip vector construction 725 module builds a TV for a shopper for the given time instance. A TV may consist of (1) location (i.e., coordinates), (2) velocity, (3) timestamp, (4) body posture (including orientation and relative position/angles of torso, limbs, and head), (5) demographics (including age, gender, and ethnicity), (6) visual attention (including gaze direction and item of interest), (7) physical interaction (including pointing direction and item of interest), (8) impression level (including the type of emotion change), and (9) biometrics (including change of EEG signal). The constructed TVs are stored in a trip database 762 for potential offline processing. Since the TVs capture and describe all the aspects of the shopper experience in the retail store, there is no need to go back and process the raw signals and videos for different applications for different purposes.

Figure 5:
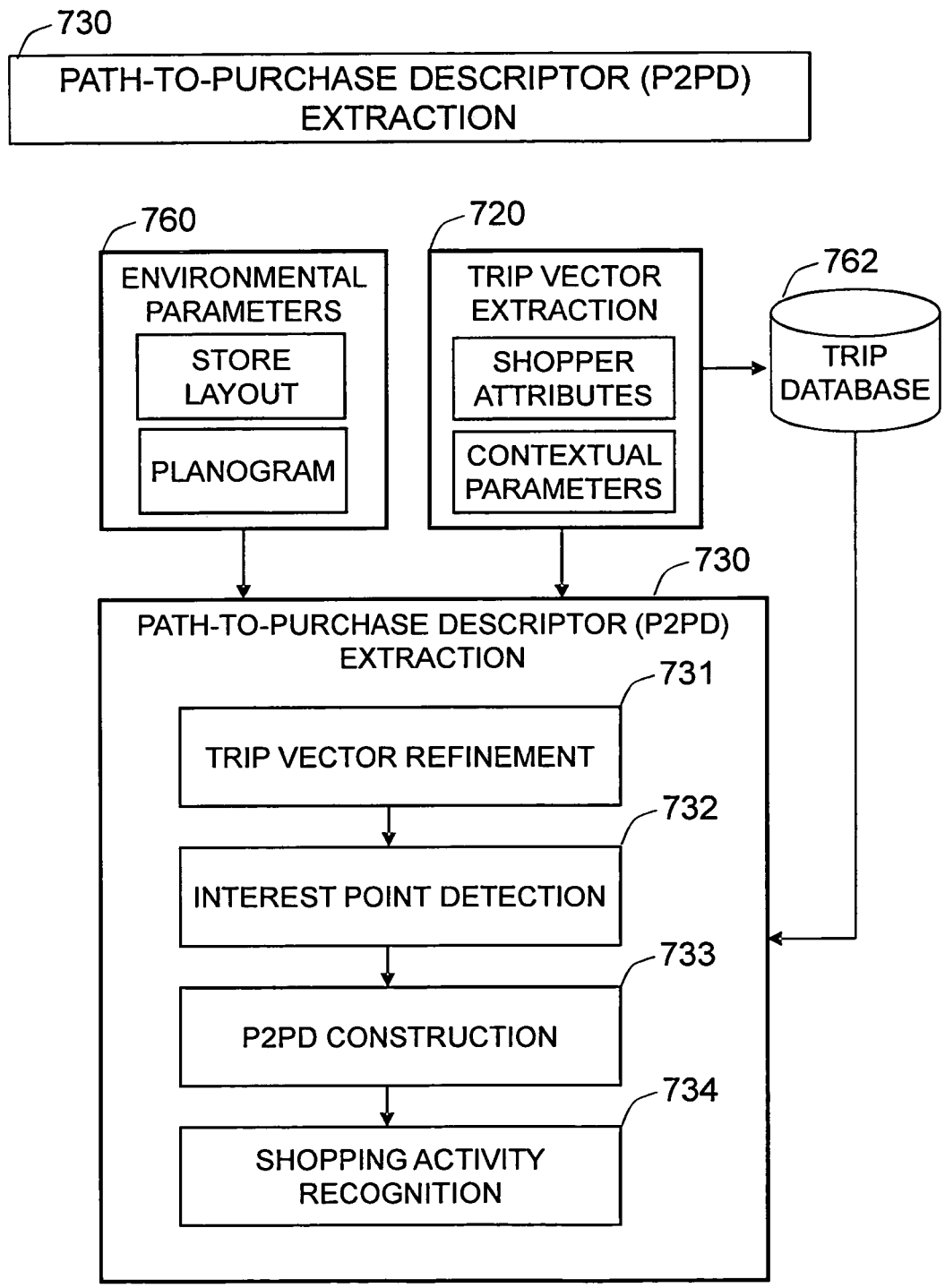
FIG. 5 shows the processes for extracting the path-to-purchase descriptors that can describe the shopper experience in the retail store in a higher-level and broader context as well as summarizing and simplifying the trip vectors of shoppers.

FIG. 5 shows the processes for extracting the path-to-purchase descriptors that can describe the shopper experience in the retail store in a higher-level and broader context as well as summarizing and simplifying the trip vectors of shoppers. Given the trip vectors extracted for a shopper and the environmental parameters 760 including store layout and planogram, the path-to-purchase descriptor (P2PD) extraction 730 module extracts the P2PDs that describe the shopper experience in a temporal domain while summarizing and simplifying the shopper experience in the retail store in terms of pre-defined events. The P2PD extraction module consist of four sub-modules: trip vector refinement 731, interest point detection 732, P2PD construction 733, and shopping activity recognition 734.

In an embodiment, the trip vector refinement 731 may be carried out in such a way that the noises in the trip trajectories of shoppers are removed in the temporal domain. The noise reduction may be carried out in such a way that the changes of parameters such as location and velocity may be smoothed out in a scale space and in multiple dimensions. The body posture parameters may also be smoothed based on, for example, 12 degree-of-freedom (DOF) body model to generate a smooth motion [Allen, Brett, Brian Curless, and Zoran Popović. "The space of human body shapes: reconstruction and parameterization from range scans." ACM Transactions on Graphics (TOG). Vol. 22. No. 3. ACM, 2003.]. In an embodiment, the trip vectors may be simplified by a set of line segments instead of curves in multiple dimensions. The location trajectory itself may be approximated by a set of line segments.

The interest point detection 732 module is then find a set of interest points along the trajectories in terms of the pre-defined events. The pre-defined events may include (1) the detection of any interaction of a shopper to a display such as detection of visual attention (i.e., gaze fixation) and physical interaction, (2) any significant behavior change such as U-turn, long dwell time, and a significant change of location, velocity, motion pattern, and (3) any significant emotional state change such as impression level and biometrical state. At each interest point, a P2PD is extracted in the P2PD construction module, which may include the event parameters such as the type of event as well as the trip vector at the interest point. Note that if the pre-defined events are updated, then the interest point detection could be carried out again based on the recorded TVs in the trip database, without having to process from the raw signals and videos.

While extracting the P2PDs, shopping activity recognition 734 is also carried out [Turaga, Pavan, et al. "Machine recognition of human activities: A survey."*Circuits and Systems for Video Technology, IEEE Transactions on* 18.11 (2008): 1473-1488.]. Note that the shopper attributes in the trip vector can be recognized by analyzing the sensor measurement made at a single time instant; however, the shopping activities such as gaze fixation, item comparison, label reading, and purchasing (e.g., putting an item into cart) are recognized only in the temporal domain. Therefore, once a shopping activity is recognized after processing measurements for a time period, then the shopping activity label is back-propagated and recorded as a part of the P2PDs.

Figure 6:
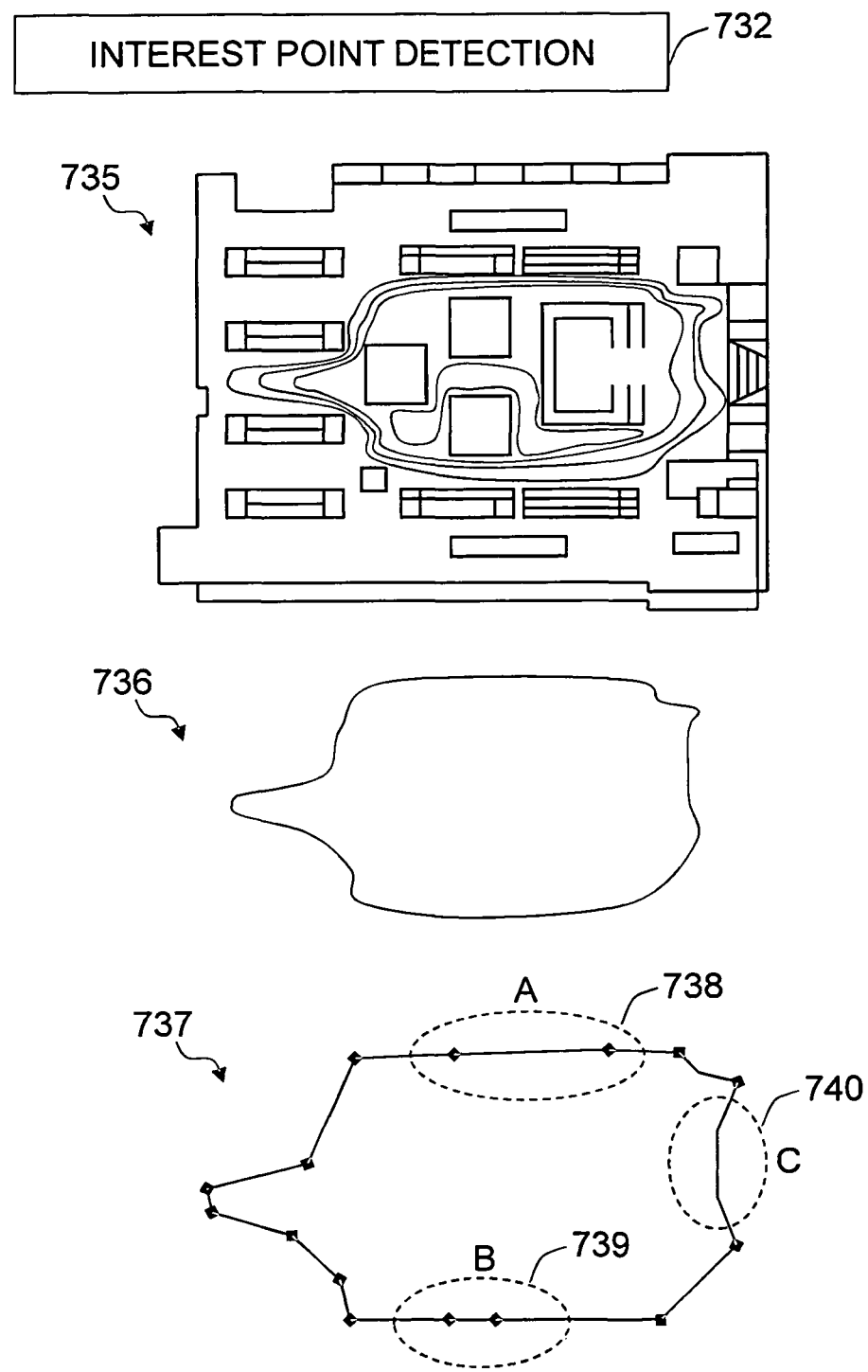
FIG. 6 shows an illustration of an exemplary interest point detection from a shopping trip trajectory in a retail store.

FIG. 6 shows an illustration of an exemplary interest point detection from a shopping trip trajectory in a retail store. The top FIG. 735 illustrates a set of shopping trip trajectories in a retail store. The middle 736 is one of the trajectories that underwent some smoothing process in the trip vector refinement module. The bottom FIG. 737 shows the trajectory approximated by a set of line segments with a set of interest points marked as black dots. The interest points are detected based on a certain set of pre-defined events such as any significant change in direction or velocity. Note that the interest points within the dotted ellipses with label A 738 and B 739 may not make sense since the trajectory does not seem to have any significant change. Although it is true, however, the pre-defined event may include the significant change in other dimensions beyond the location or direction. The events may be detected at those interest points because the shopper may interact with a display at the interest points or may stop and stay longer. Contrarily, the ellipse labeled as C 740 does not have any interest point inside although it may look like some interest points may exist in it. Yet, it is because there is apparently no event detected.

The gathering of all the P2PDs at the interest points will be considered as the summary of the shopping trip of a shopper as said earlier.

Figure 7:
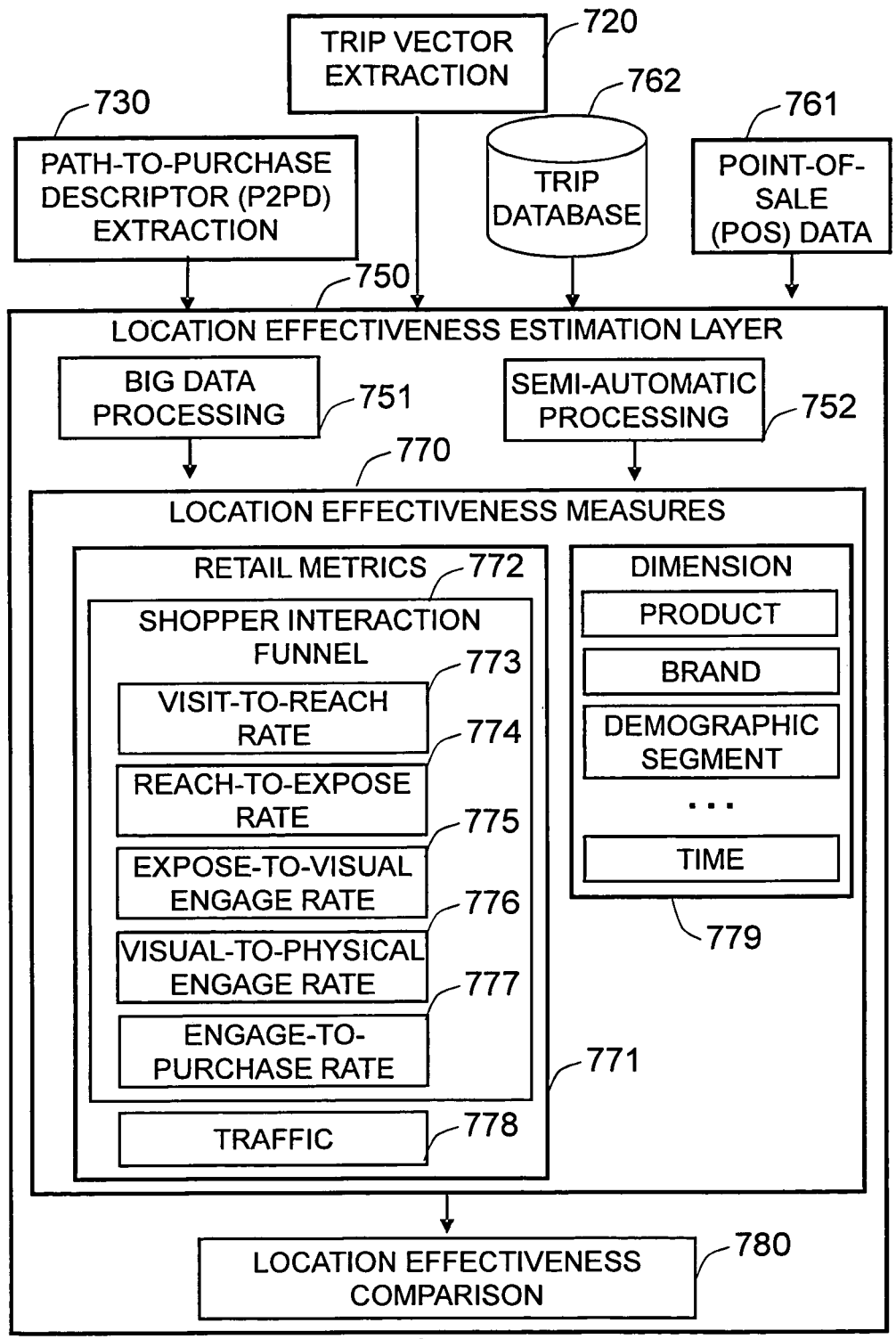
FIG. 7 shows the processes for estimating the location effectiveness of displays in a retail store based on the trip vectors and/or the path-to-purchase descriptors as well as the point-of-sale (POS) data.

FIG. 7 shows the processes for estimating the location effectiveness of displays in a retail store based on the trip vectors and/or the path-to-purchase descriptors as well as the point-of-sale (POS) data. Given the P2PDs, the location effectiveness estimation layer 750 performs the processing of the P2PDs to produce actual retail metrics in numbers so that the numbers for each location may be compared together to determine which location is more or less effective and to yield the ranks of them. Processing of the trip data of shoppers such as P2PDs may be carried out by Big Data processing 751 and/or semi-automatic processing 752 by, for example, annotators. Employing the Big Data technologies allows the system to mine the spatio-temporal trip data as well as even several hundreds of millions of trip data in the trip database 762 to produce the statistics and trends in terms of the retail metrics [Laxman, Srivatsan, and P. Shanti Sastry. "A survey of temporal data mining."*Sadhana* 31.2 (2006): 173-198. And Koperski, Krzysztof, Junas Adhikary, and Jiawei Han. "Spatial data mining: progress and challenges survey paper." *Proc. ACM SIGMOD Workshop on Research Issues on Data Mining and Knowledge Discovery, Montreal, Canada.* 1996.]. The retail metrics include the statistics of various traffic 778 such as traffic in front of a display, traffic at the entrance, traffic in an end cap, etc. and the metrics for shopper interaction funnel such as visit-to-reach rate 773, reach-to-expose rate 774, expose-to-visual engage rate 775, visual-to-physical engage rate 776, and engage-to-purchase rate 777. The Big Data processing 751 may also correlate the POS data 761 to accurately match the transaction history with other shopper behaviors.

Such retail metrics may be analyzed in a particular dimension, which defines a subspace of the data for a specific group or segment. The dimension may include product, brand, demographic segment, and time. For example, the shopper interaction funnel 772 may be analyzed only for a specific product based on a specific demographic segment during a specific season or a time period. According to the configuration of the dimension, the system can define the corresponding subspace of the trip data and then estimates the retail metrics only for data in the subspace.

In addition, the Big Data processing 751 may find the statistics or trends of the trip data in the subspace where all the trips that share a particular overlap. For example, the system may derive statistics or trends of the trip data of the shoppers in terms of the retail metrics who made U-turn in a specific aisle.

Although the P2PDs encode all the information of interest about the shopper experience that trip vectors contain and even higher-level descriptions such as shopping activities, the Big Data processing 751 module and the semi-automatic processing 752 module may be allowed to utilize the TVs instead of P2PDs in some circumstances.

In an exemplary embodiment, the present invention can process the video-based analysis semi-automatically, where a manual annotation tool is used in combination with automatic behavior analysis and demographic analysis. The present invention can utilize an efficient video annotation tool, such as U.S. patent application Ser. No. 12/011,385 filed on Jan. 25, 2008 of Sharma, et al. (hereinafter Sharma Ser. No. 12/011,385).

Figure 8:
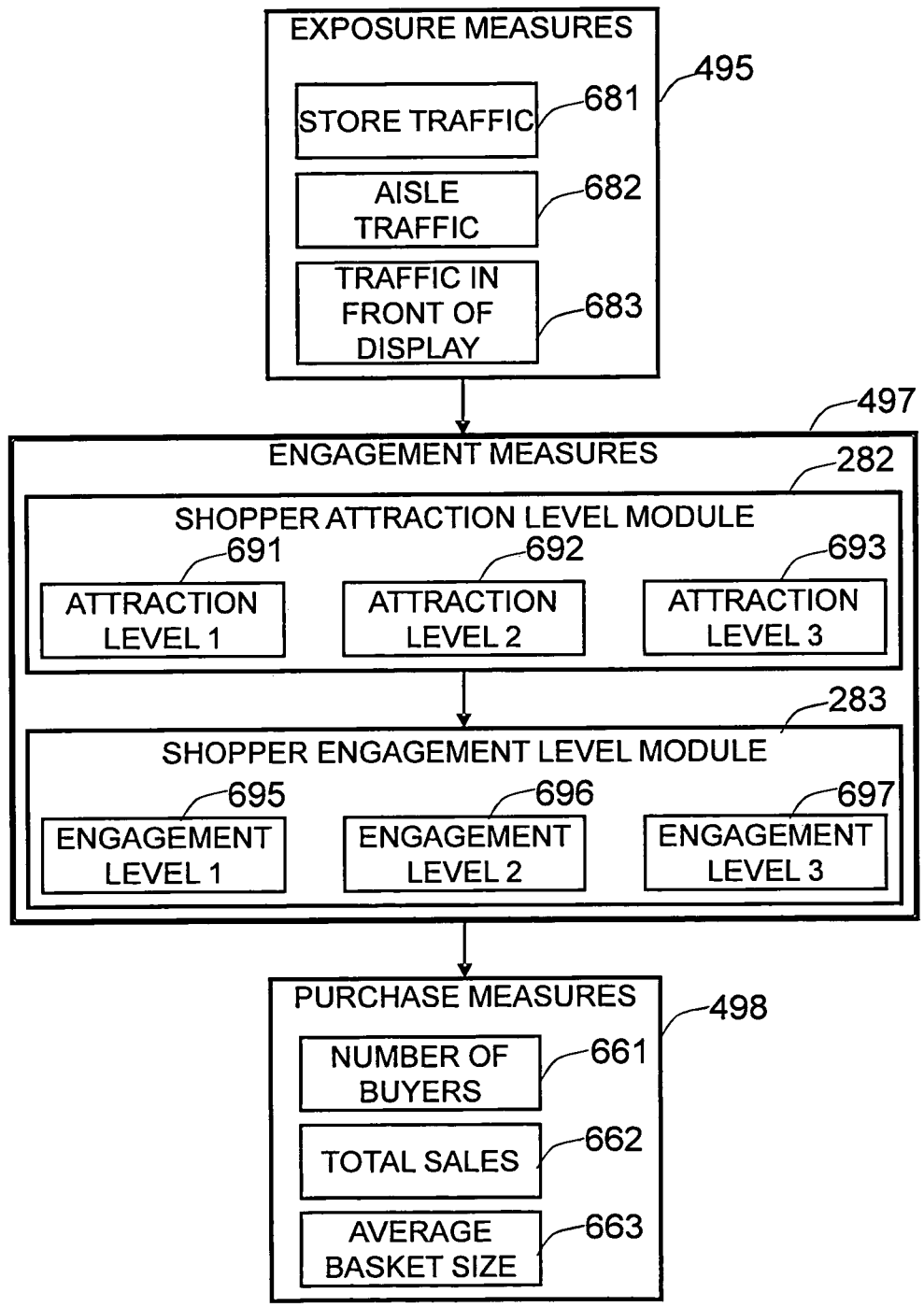
FIG. 8 shows exemplary processes of one of the preferred embodiments of the location effectiveness measures in terms of the shopper interaction.

FIG. 8 shows exemplary processes of one of the preferred embodiments of the location effectiveness measures in terms of the shopper interaction.

In an exemplary embodiment, the present invention can identify numbers, such as traffic count, along various interaction stages of the person with each display in the locations. For example, the present invention can count the exposure measures 495, including store traffic 681, and more specifically the traffic in the vicinity of the measured locations, including the aisle traffic 682 and traffic in front of the display 683. This identifies the ability of the display in each location to reach shoppers for influencing them to the later stages, such as engagement and purchase.

The present invention also identifies the ability of the display in the locations to engage with shoppers at the engagement measures 497, whose exemplary sub-stages can comprise attraction level and engagement level. Attraction level itself can have various levels—ranging from glancing at the display to briefly noticing it to noticing it for an extended time period. For example, the shopper attraction level module 282 determines the attraction level of shoppers based on predefined criteria, i.e., "attraction level 1" 691, "attraction level 2" 692, and "attraction level 3" 693. In the example, the "attraction level 1" 691 can represent those shoppers that glanced at a display between two predefined thresholds:

Attraction Level 1:
$$\text{Threshold1} \leq \text{ViewingTime} < \text{Threshold2} \quad (1)$$

Likewise, the "attraction level 2" 692 can represent those shoppers that briefly noticed the display for a predefined time period, such as greater than or equal to "Threshold 2" and less than "Threshold 3", and "attraction level 3" 693 can represent those shoppers that noticed the display for extended periods, such as greater than or equal to "Threshold 3" and less than "Threshold 4", where the thresholds are predefined by the owner of an embodiment of the present invention.

The decision process in the shopper attraction level module 282 utilizes the spatial and temporal data produced by the video-based analysis of the shoppers. For example, if a shopper's track stays at a location, Loc(Xi, Yi), within a bounding box in the vicinity of a display for a longer threshold of time "Th1" but less than or equal to another threshold "Th2" of time, the activity can be identified as belonging to one of the attraction-level categories, based on the predefined values for the thresholds "Th1" and "Th2." As discussed, the details of the behavior analysis based on the spatial and temporal attributes of the person tracking can be found in Sharma Ser. No. 11/901,691.

Further, the present invention evaluates the engagement process of the person with each display in granular details. The granular detail analysis involves evaluating the visual and physical interaction of shoppers with the display, like reading labels, comparing products, comparing package sizes, and sniffing products.

For example, the shopper engagement level module 283 makes a decision for the engagement level of shoppers based on predefined criteria for the engagement levels, i.e.

"engagement level 1" 695, "engagement level 2" 696, and "engagement level 3" 697, in response to the display. In the example, the "engagement level 1" 695 can represent shoppers' behavior of touching the display, "engagement level 2" 696 can represent shoppers' behavior of reading labels on the display, and "engagement level 3" 697 can represent shoppers' behavior of comparing displays.

The decision process in the shopper engagement level module 283 can also utilize the spatial and temporal data produced by the video-based analysis of the shoppers in a similar way as the decision process of the shopper attraction-level module 282 discussed above. However, for complex engagement activities, the decision process in the shopper engagement level module 283 utilizes the semi-automatic other data measurement and analysis for interaction, where a manual annotation tool is used.

Finally, the present invention will identify the number of buyers 661 that make a purchase, e.g., by putting a product in the cart or a shopping basket, total sales 662, and average basket size 663, in the locations, at the purchase measures 498 stage.

Figure 9:
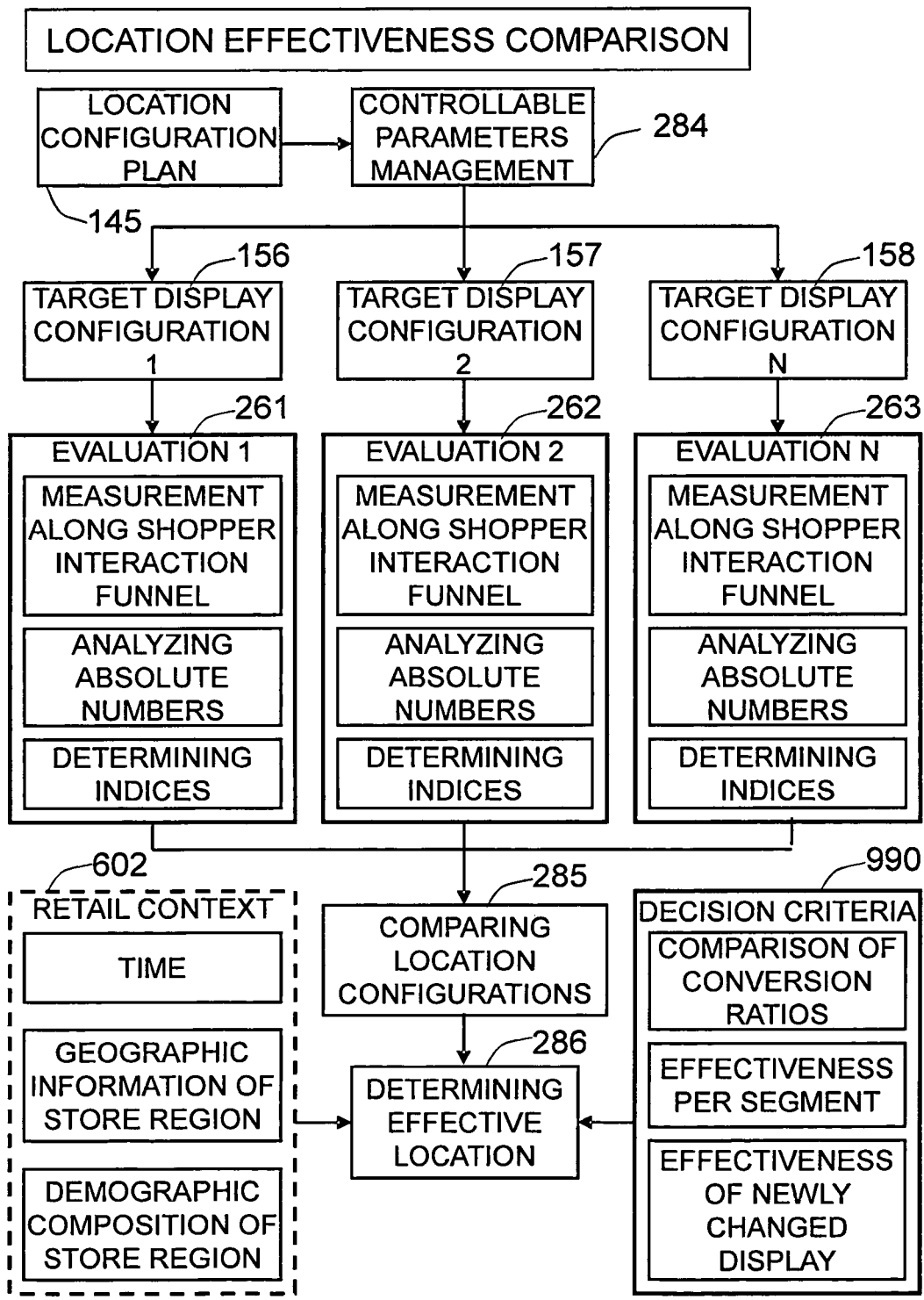
FIG. 9 shows detailed processes for an exemplary location effectiveness comparison based on the location effectiveness measures.

FIG. 9 shows detailed processes for an exemplary location effectiveness comparison based on the location effectiveness measures.

Based on a location configuration plan 145 all of the controllable parameters pertaining to the display are maintained to be the same at the controllable parameters management 284 stage. The controllable parameters comprise
  promotion,
  price,
  advertising activity,
  design of the products, and
  marketing element.

While maintaining the controllable parameters to be the same, through the changes in the display in the location, the present invention measures the effect of the changes among the locations. The display comprises
  product display,
  marketing display,
  signage display,
  merchandize,
  category, and
  packaging.

The changes in the display in each location are determined and maintained at the target display configuration stages, such as the target display configuration 1 156, target display configuration 2 157, and target display configuration N 158, in predefined locations in a store. In each evaluation process for the locations, e.g., "evaluation 1" 261, "evaluation 2" 262, and "evaluation N" 263, the present invention measures the variables along each stage of the shopper interaction funnel, analyzes the absolute numbers of the shopper interactions, and determines indices that indicate the performance of the each location configuration. The location configurations are compared 285 with each other along several measurements, based on the location effectiveness decision criteria 990, to determine the effective location 286. The location effectiveness decision criteria 990 can comprise comparison of conversion ratio among the retail metrics along each stage of the shopper interaction funnel, effectiveness count per shopper segment, and prominent value changes induced by the newly changed factors in the display. The comparison along multiple measurements provides a performance score card for each concept, indicating its ability to drive desired shopper behavior.

In an exemplary embodiment, the present invention can optionally handle the information in a retail context 602 for determining effective location 286. As mentioned, in a preferred embodiment of the present invention, it is an objective to maintain the controllable parameters to be the same throughout the measured locations. However, contextual information can affect how the display performs, i.e., how the display influences the shopper behavior in a location. If there exist other parameters in a retail context 602, outside of the controllable parameters, that could skew the output of the measurement, the present invention can minimize the effects of the other parameters by normalizing the calculation. For example, a weighted value of the other parameters can be subtracted from the traffic count for a location.

The location effectiveness measurement in the retail context 602 also shows the correlation between the contextual information and the display performance in the location. The retail context in the present invention could comprise temporal information such as time of year, and geographic information such as geographic information specific to the store region where the store is located and demographic composition of the store region.

FIG. 10 shows an exemplary network of a plurality of means for control and processing and a plurality of means for capturing sensor measurements (e.g., images and mobile device signals) in the present invention, where the network consists of a plurality of first means for control and processing 107 and a plurality of second means for control and processing 108, which communicate with each other to synchronize the time-stamped lists of sensor measurements in the measured locations.

In the exemplary embodiment, a plurality of means for capturing images, i.e., a plurality of first means for capturing images 101, are connected to the means for video interface in a first means for control and processing 107.

If the distance between the plurality of means for capturing sensor measurements is greater than a means for control and processing can handle, e.g., in order to cover the multiple areas for the targeted location configurations that are located far from each other, the plurality of means for capturing images can be connected to multiple means for video interface.

For example, in the exemplary embodiment shown in FIG. 9, a plurality of first means for capturing images 101, such as a "means for capturing images 1" 111 and a "means for capturing images 2" 112, are connected to the means for video interface in a first means for control and processing 107 that is different from the first means for control and processing 107 of another plurality of first means for capturing images 101, such as a "means for capturing images 5" 115 and a "means for capturing images 6" 116. The plurality of means for control and processing can be connected in a local area network and communicate with each other.

In an exemplary deployment of the system that embodies the present invention, the first means for capturing images 101 can be installed where the field-of-view can cover the traffic of the people in the measured location and the second means for capturing images 102 can be installed near a display in the location for the close view of the people. The means for capturing images are connected to the means for video interface through cables.

In addition to the means for capturing images and means for control and processing of the images, in an exemplary deployment of the system, a plurality of means for receiving/detecting mobile device signals 103 such as Bluetooth and Wi-Fi may be installed and connected to the means for control and processing 108.

The digitized video data from the means for video interface is transferred to the means for control and processing that executes sensor fusion and computer vision algorithms on the data while the other measured sensor signals are also transferred to the means for control and processing that executes sensor fusion and signal processing algorithms. The means for control and processing can have internal means for storing data or external means for storing data.

The means for capturing images can comprise an analog camera, USB camera, or Firewire camera while the means for detecting mobile device signals can comprise of signal receivers (e.g., Wi-Fi access point and Bluetooth receiver). The means for video interface, which can comprise a video frame grabber, USB interface, or Firewire interface, are typically included in the same enclosure as the means for control and processing. The means for control and processing can be a general purpose personal computer, such as a Pentium 4/i5/i7/Atom/MAC/ARM-based PC, or a dedicated hardware that can carry out the required computation. The means for control and processing, as well as the means for video/signal interface, can be placed locally or remotely, as long as the connection to the means for capturing images and the means for detecting mobile device signals can be established. The internal means for storing data, such as internal hard disk drives and solid state drive, is placed within the same enclosure as the means for control and processing. The external means for storing data, such as a network attached storage, cloud storage, or internal hard disk drives contained in a remote computer, can be placed locally or remotely, as long as a means for transferring data is available.

In an exemplary embodiment, a general purpose USB webcam or IP camera can serve as the means for capturing images, and a general purpose Wi-Fi access point can do so as the means for detecting Wi-Fi signals. A quad-core i7 3.2 GHz PC or a dual-core i5 PC having 4 GB memory can serve as a means for control and processing, where a generic USB interface included in the PC's motherboard can serve as a means for video interface. A generic SATA/IDE hard disk drive or a solid state drive can serve as the internal means for storing data or the external means for storing data.

The present invention can generate time-stamped measurements in accordance with the behavior analysis, segmentation, and impression analysis measurement, utilizing a time server 109. The exemplary time server 109 can maintain a synchronized time in the network of means for control and processing. In another exemplary embodiment, a first means for control and processing 107 can act as a server, and a plurality of second means for control and processing 108 can act as clients. The server can run its own local clock or be connected to a global time server 109 for the synchronization utilizing a time synchronization protocol, such as the Network Time Protocol (NTP). The time-stamped measurements facilitate the synchronous comparison among multiple location configurations.

The number of means for capturing images or means for detecting mobile device signals per a means for control and processing varies, depending on the system configuration in the physical space. However, each means for control and processing knows the location and the identification of each of its associated plurality of means for capturing images and means for detecting mobile device signals and the area covered by the means for capturing images and the means for detecting mobile device signals.

FIG. 11 shows a "first exemplary matrix for traffic count" 671 and a "first exemplary matrix for conversion ratio" 672 based on the first traffic count matrix, where the matrices are used to measure the location effectiveness for a location, e.g. "LOCATION 1."

In the "first exemplary matrix for traffic count" 671, the row indices, i.e. "EX1," "EX2," "EX3," "EN1," "EN2," "EN3," "P1," "P2," and "P3," indicate an exemplary level of interaction between the people and the display, such as the product display or marketing display, that are used as the associated objects to measure the location effectiveness in a target location, i.e. "location 1." The column indices, i.e. "DEMO CLASS 1," "DEMO CLASS 2," "DEMO CLASS 3," and "TOT" indicate exemplary classes of demographic groups and a total number of people in all demographic groups in the target location. Therefore, the values in the first three columns in the matrix indicate the number of people at each level of interaction according to the demographic class to which the people belong, and the values in the last column in the matrix indicate the total number of people in all demographic groups at each level of interaction.

In the "first exemplary matrix for conversion ratio" 672, the row indices, i.e. "CR1" through "CR8," indicate conversion ratio of the traffic count from an interaction level to the next interaction level, based on the first traffic count matrix. For example, the "CR1" indicates the conversion ratio from the interaction level "EX1" to the next interaction level "EX2," the "CR2" indicates the conversion ratio from the interaction level "EX2" to the next interaction level "EX3," and so on. The column indices, i.e., "C1," "C2," "C3," and "TOT" indicate exemplary classes of demographic groups and a total number of people in all demographic groups in the target location, similar to the first traffic count matrix. Therefore, the values in the first three columns in this matrix indicate the conversion ratio of the traffic count from one interaction level to the next interaction level according to the demographic class to which the people belong. The values in the last column in this matrix indicate the conversion ratio of the traffic count for the total number of people in all demographic groups at each level of interaction.

The matrices are generated by the processes of the path analysis 470 and the behavior analysis 480 in association with the demographic classification 814 in the present invention.

FIG. 12 shows a "second exemplary matrix for traffic count" 673 and a "second exemplary matrix for conversion ratio" 674 based on the second traffic count matrix, where the matrices are used to measure the location effectiveness for another location, e.g. "LOCATION N."

The row indices, column indices, and values of the "second exemplary matrix for traffic count" 673 indicate the same as those of the "first exemplary matrix for traffic count" 671, respectively. Likewise, the row indices, column indices, and values of the "second exemplary matrix for conversion ratio" 674 indicate the same as those of the "first exemplary matrix for conversion ratio" 672 above, respectively.

The matrices are also generated by the processes of the path analysis 470 and the behavior analysis 480 in association with the demographic classification 814 in the present invention with regard to the "LOCATION N."

The location effectiveness measurement 280 process in the present invention compares the matrices for the measured locations, and can makes a decision which location configuration has a better effectiveness to the people in the location with regard to the related display, such as a product display or a marketing display, in the location.

For example, the "second exemplary matrix for traffic count" 673 and the "second exemplary matrix for conversion ratio" 674 for the "LOCATION N" show that the people from the "DEMO CLASS 2," and "DEMO CLASS 3" shows a larger decrease in the overall purchase conversion rate than that of the "first exemplary matrix for traffic count" 671 and the "first exemplary matrix for conversion ratio" 672 for the "LOCATION 1."

Particularly, the conversion ratio at row "CR3" and column "C2" in the "second exemplary matrix for conversion ratio" 674 for the "LOCATION N" shows that the people in the "DEMO CLASS 2" group converted from the exposure level of interaction to the engagement level of interaction at a much lower rate compared to the comparable conversion ratios of other demographic groups in the same location, while the people in "DEMO CLASS 2" group in the "LOCATION 1" do not show such a significant reduction. This data indicates that the location, "LOCATION N," has less effectiveness with regard to the interaction between the people in "DEMO CLASS 2" group and the target display, such as a product display or a marketing display, in the location, compared to the other location, "LOCATION 1."

Likewise, other meaningful analyses can be made based on the comparisons of the data in the matrices, such as the comparison between the two conversion ratios at row "CR6" and column "C2" and at row "CR6" and column "C3" in the "second exemplary matrix for conversion ratio" 674 for the "LOCATION N" and the other two conversion ratios at row "CR6" and column "C2" and at row "CR6" and column "C3" in the "first exemplary matrix for conversion ratio" 672 for the "LOCATION 1."

Rule Application Logic Module

In the present invention, the analysis of the measured data can be further facilitated by applying a set of predefined rules for the location effectiveness in a rule base through a rule application logic module. The rule application logic module can enable a dynamic rule application rather than relying on an ad hoc solution or static hard-code in translating the measured data.

An exemplary rule application logic module can be implemented utilizing the information unit verification technologies in U.S. patent application Ser. No. 11/999,649 of Jung, et al. (hereinafter Jung Ser. No. 11/999,649).

The rule application logic module enables the adjustment in the analysis and extraction of characteristic information to be done in a structured and dynamic way. The exemplary parameter models, such as the analysis formula and statistical model, can be dynamically adjusted based on the rule application logic module.

In an exemplary embodiment, the rule application logic module constructs a characteristic information extraction criteria based on a set of predefined rules. The rule application logic module can further construct the criteria based on a combination of a set of predefined rules, in which the analysis of the data can be performed in further detail. The rule application logic module can further define domain-specific criteria for the location effectiveness.

As discussed above, it is an objective of the present invention to maintain all controllable parameters pertaining to the display to be the same. The controllable parameters comprise promotion, price, advertising activity, design of the products, and marketing element.

The rule application logic module can facilitate the process of maintaining all controllable parameters in the analysis, by normalizing the variance within the predefined thresholds. For example, if an effort to maintain the same price for a product throughout the measured locations is not satisfactorily achievable, the differences can be adjusted by applying normalization offset values to the differences within predefined thresholds using the rule application logic module. Then, the analysis can take this into consideration at the final analysis of the location effectiveness.

The application of the rule application logic module can differentiate the levels of measurement and analysis of the location effectiveness, where a first set of criteria are applied throughout the preliminary data measured for all of the locations, and a second set of criteria are applied to a predefined subset of the sampled data measured for a subset of all locations, in order to serve the specific needs of the predefined subset. An exemplary first set of criteria can typically comprise common criteria throughout all of the locations, and the second set of criteria is typically different from the first set of criteria.

FIG. 13 shows an exemplary shopper interaction with one of the merchandise locations, such as "location 1" 131 and "location 2" 132, for a product, such as a shampoo product, in which the interaction measurement by the present invention can be used to evaluate the location effectiveness. In this exemplary shopper interaction configuration, the product is merchandised in two different display locations, i.e., the "location 1" 131 and "location 2" 132, in a retail store. In this case, the shopper interaction with the merchandise location 132 is evaluated. The present invention will evaluate shopper responses to any display location, like 132, along various stages of the shopper interaction funnel (e.g., (1) exposure, engagement, and purchase or (2) visit, reach, expose, visual engage, physical engage, and purchase). In addition, the present invention will determine the types of behavior exhibited in front of the display location, like shopper velocity and shopping time in front of the location. This will help to determine the effectiveness of a display location in influencing shopper behavior.

FIG. 14 shows an exemplary shopper interaction with one of the merchandise locations, such as "location 3" 133 and "location 4" 134, for a product, such as a shampoo product, in which the interaction measurement by the present invention can be used to evaluate the location effectiveness. In this exemplary shopper interaction configuration, the product is merchandised in two different display locations, i.e., "location 3" 133 and "location 4" 134, in a retail store. In this case, the shopper interacts with both of the display locations for the product. The shopper spends some time looking at the product in the display location, "location 4" 134, but does not make a purchase from there. Instead the shopper travels to the other product display location, "location 3" 133, and after spending some time interacting with the product makes a purchase from this location. This evaluation indicates the different types of behavior exhibited in front of both of the locations to determine the effectiveness of each location in influencing shopper behavior. The present invention can also rank the effectiveness of each location in instances like this, where a similar product is merchandised in more than one location within a store.

FIG. 15 shows an exemplary parallel monadic research evaluation process in the present invention, wherein two different display locations, such as "location 5" 135 and "location 6" 136, for a product are evaluated in two individual retail stores during the same time period. Care will be taken to ensure that the characteristics of the stores under study, like the geographic regions of the stores, and the demographics and psychographics of the store shoppers are one and the same to guarantee that the evaluations are uniform and consistent. In addition, efforts will be undertaken to ensure all factors pertaining to the display, like the promotional activity, price of the product, and the type of display, are one and the same.

In this case, the product display at "location 5" 135 is located closer to aisle 4 in store 1, whereas the product display at "location 6" 136 is located closer to aisle 1 in store 2. The present invention will evaluate the effectiveness of the two locations for the product in influencing shopper behavior. The present invention will also evaluate the appeal of each of the display locations to various demographic and trip type shopper segments to get a complete understanding of the effectiveness.

FIG. 16 shows an exemplary sequential monadic research evaluation process in the present invention, wherein the same display for a product is placed in two different regions of the store, such as "location 7" 137 and "location 8" 138, and evaluated during two different time periods. Appropriate care will be taken to ensure that the time periods do not have any other variation, like changes in the promotional activity and price of the product or the type of display. The present invention will evaluate the display in "location 7" 137 for a particular time period, for example one week, to identify its effectiveness in influencing shopper behavior. The product display will then be moved to another location, "location 8" 138, in the same store to determine its effectiveness in influencing shopper behavior. At the end of the study period, the most effective and least effective locations in terms of their appeal to various shopper segments and performance along the various stages of the shopper interaction funnel, will be identified.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples provided.

What is claimed is:

1. A method, performed by at least a camera, at least a mobile sensor, and at least a computer executing a set of vision and sensor algorithms and a instructions in tangible memory, for evaluating the effectiveness of a display in a location within a store based on a behavior and response analysis of a plurality of people with respect to the display in the location, comprising the following steps of:

a) deploying a plurality of cameras and mobile signal sensors within a vicinity of a display,
wherein the plurality of cameras and mobile signal sensors capture a plurality of images and mobile device signals of a plurality of people in the vicinity of the display, b) processing the plurality of images and mobile device signals to convert image and mobile signal data into a set of behavior response data, wherein the set of behavior response data comprises at least a set of shopper attributes and shopper experiences in the store,
wherein the shopper attributes comprise location, velocity, body posture, gaze, demographics, and biometrics, wherein location and velocity are determined using mobile device signal triangulation and trilateration or images, body posture is determined using an aggregation of images from different angles or using a human skeleton model, gaze is determined using detection and localization of a face, pupils, or eyes, and demographics are determined using machine learning classification, c) performing a sensor fusion of a subset of measurements for each shopper attribute for a person using a sensor fusion algorithm, and estimating each shopper attribute through signal and computer vision processing, d) constructing a trip vector for each position of a person at a given time instance by aggregating a location of the person, a velocity, a timestamp, a body posture, a set of demographics, a visual attention with an item of interest, a physical interaction with an item of interest, an impression level, and a set of biometrics, further comprising the following steps:

i) detecting the visual attention of the set of shoppers on a display by detecting a gaze fixation and a gaze direction and by localizing an intersection point between the gaze direction and a planogram wherein gaze is determined by detecting the eyes or the pupils of the set of shoppers, ii) detecting the physical interaction of the set of shoppers with a display by estimating the limb position of the set of shoppers and by localizing an intersection point between the limb position and the planogram if the limb position is inside a shelf or an area of the display, iii) performing an impression analysis by measuring an impression level through a viewership of the set of people, iv) constructing a trip vector for each position of a person at a given time instance which comprises the set of shopper attributes and a set of contextual parameters, wherein the set of shopper attributes comprise location, velocity, body posture, demographics, and biometrics, wherein the set of contextual parameters comprise visual attention, physical interaction, and impression level, and v) storing the trip vectors into a trip database,
wherein the trip vector is extracted at each given time instance consecutively, e) building a path-to-purchase descriptor for a set of interest points wherein the path-to-purchase descriptor is constructed by extracting a higher-level description of the shopper experience in the store and incorporating temporal analysis of the set of shopper attributes, the set of contextual parameters, and the environmental parameters, further comprising the following steps:

i) refining the trip vectors by removing noise and by smoothing the parameters of the trip vectors if necessary, ii) detecting the set of interest points based on a set of pre-defined events comprising visual attention, physical interaction, a significant behavior change, and a significant emotional state change, wherein the significant behavior change comprises a U-turn, a dwell time, or a significant change in location, velocity, motion pattern, and wherein the significant emotional state change comprises a change in impression level or biometrical state, iii) constructing a path-to-purchase descriptor at each interest point, which includes a set of event parameters comprising the type of event and the trip vector at the interest point, wherein constructing the path-to-purchase descriptor uses a real-time feed of the trip vectors or recorded trip vectors in the trip database and iv) recognizing a set shopping activities over multiple time instances comprising label reading, item comparing, and purchasing—by first performing a temporal analysis of the set of shopper attributes and back-propagating a detected shopping activity label to the extracted path-to-purchase descriptors, f) processing the path-to-purchase descriptors for the set of interest points of a location and correlated point-of-sale data to obtain a set of retail metrics for the location, g) maintaining controllable parameters pertaining to a display, wherein the controllable parameters comprise promotion activity, price, advertising activity, design of the products, and marketing elements in order to measure the impact of changes to the controllable parameters across a set of locations of displays, wherein a rule application module is applied to normalize variance within a set of predefined thresholds, g) evaluating the effectiveness of the display in the location by comparing the set of retail metrics for a set of people with the set of retail metrics for another set of people wherein the set of retail metrics comprises traffic in the vicinity of the display, dwell time, conversion ratios, and purchase events in the location evaluating the effectiveness of the display in the location by comparing the set of retail metrics for a set of people with the set of retail metrics for another set of people wherein the set of retail metrics comprises traffic in the vicinity of the display, dwell time, conversion ratios, purchase events, and other responses in the location in order to generate the rankings of a set of displays in different locations, wherein the set of retail metrics include traffic statistics and trends and a conversion rate between different stages in a shopper interaction funnel, wherein the different stages in the shopper interaction funnel comprise visit-to-reach rate, reach-to-expose rate, expose-to-visual engage rate, visual-to-physical engage rate, and engage-to-purchase rate stages, wherein the location effectiveness evaluation comprises a relative performance comparison of the set of displays in different locations, h) further evaluating the effectiveness of the display in the location by measuring an attraction level based on a viewing time and an engagement level based on a predetermined behavior, and i) further evaluating the effectiveness of the display in the location by completing a parallel monadic research evaluation process wherein two different display locations, for a product are evaluated in two individual retail stores during a same time period or by completing a sequential monadic research evaluation process, wherein the same display for a product is placed in two different regions of the store.

2. The method according to claim 1, wherein the method further comprises a step of estimating the location effectiveness based on the contextual description of the shopper experience and a set of point-of-sale data, further comprising the following steps:

a) processing the contextual description of the shopper experience by employing automatic processing or semi-automatic processing in order to measure the location effectiveness using a set of retail metrics across a set of dimensions, wherein the set of dimensions comprise product, brand, demographic segment, and time, b) evaluating the location effectiveness based on the set of retail metrics in order to generate the rankings of a set of displays in different locations, wherein the set of retail metrics include traffic statistics and trends and a conversion rate between different stages in a shopper interaction funnel wherein the different stages comprise visit, reach, expose, visual engagement, physical engagement, and purchase measurements or exposure, engagement, and purchase measurements wherein the location effectiveness evaluation comprises a relative performance comparison of the set of displays in different locations.

3. The method according to claim 2, wherein the method further comprises a step of generating a set of indices based on a set of location-sensitive measurements, wherein the location-sensitive measurements comprises demographic analysis, wherein the demographic analysis comprises traffic count per demographics, dwell time per demographics, and purchase events per demographics.

4. The method according to claim 2, wherein the method further comprises a step of comparing the effectiveness of a set of displays in different locations synchronously or comparing the effectiveness of a single display at multiple locations at different times.

* * * * *